United States Patent
Mutsuda et al.

(10) Patent No.: US 10,750,815 B2
(45) Date of Patent: Aug. 25, 2020

(54) SHEET FOR SHOE SOLE AND SHOE SOLE INCLUDING THE SAME

(75) Inventors: Mitsuteru Mutsuda, Himeji (JP); Hiroaki Arita, Himeji (JP); Tomohiro Kawahara, Himeji (JP)

(73) Assignee: DAICEL-EVONIK LTD., Tokyo (JP)

( * ) Notice: Subject to any disclaimer, the term of this patent is extended or adjusted under 35 U.S.C. 154(b) by 835 days.

(21) Appl. No.: 14/000,139

(22) PCT Filed: Mar. 11, 2011

(86) PCT No.: PCT/JP2011/055810
§ 371 (c)(1),
(2), (4) Date: Aug. 16, 2013

(87) PCT Pub. No.: WO2012/124026
PCT Pub. Date: Sep. 20, 2012

(65) Prior Publication Data
US 2013/0318835 A1 Dec. 5, 2013

(51) Int. Cl.
| | |
|---|---|
| A43B 13/02 | (2006.01) |
| A43B 13/04 | (2006.01) |
| B32B 25/08 | (2006.01) |
| B32B 27/34 | (2006.01) |
| B32B 27/40 | (2006.01) |
| A43B 13/12 | (2006.01) |
| A43B 13/24 | (2006.01) |
| B29D 35/14 | (2010.01) |
| B29C 35/02 | (2006.01) |
| C08G 69/26 | (2006.01) |
| C08L 77/06 | (2006.01) |

(52) U.S. Cl.
CPC .......... *A43B 13/023* (2013.01); *A43B 13/026* (2013.01); *A43B 13/04* (2013.01); *A43B 13/12* (2013.01); *A43B 13/24* (2013.01); *B29C 35/0222* (2013.01); *B29D 35/142* (2013.01); *B32B 25/08* (2013.01); *B32B 27/34* (2013.01); *B32B 27/40* (2013.01); *C08G 69/26* (2013.01); *C08L 77/06* (2013.01); *B32B 2437/02* (2013.01)

(58) Field of Classification Search
CPC ..... A43B 13/023; A43B 13/026; A43B 13/04; A43B 13/12; A43B 13/24; B29C 35/0222; B29D 35/142; B32B 25/08; B32B 27/34; B32B 27/40; B32B 2437/02; C08G 69/26; C08L 77/06
See application file for complete search history.

(56) References Cited

U.S. PATENT DOCUMENTS

| | | | | |
|---|---|---|---|---|
| 5,132,182 A | * | 7/1992 | Grosse-Puppendahl | ..................... C08J 5/12 156/307.7 |
| 5,756,575 A | * | 5/1998 | Kawasaki | ............... C08L 23/02 524/525 |
| 2006/0108708 A1 | * | 5/2006 | Wakita | .................... B32B 27/40 264/248 |
| 2007/0068039 A1 | * | 3/2007 | Nau | ..................... A43B 3/0036 36/25 R |
| 2008/0193774 A1 | | 8/2008 | Stone et al. | |

FOREIGN PATENT DOCUMENTS

| | | | |
|---|---|---|---|
| CN | 101910312 A | | 12/2010 |
| JP | 8-294933 A | | 11/1996 |
| JP | 8-511741 A | | 12/1996 |
| JP | 2000-41702 A | | 2/2000 |
| JP | 2005036147 A | * | 2/2005 |
| JP | 2010-22582 A | | 2/2010 |
| JP | 2011-379 A | | 1/2011 |
| WO | WO 95/00331 A1 | | 1/1995 |

OTHER PUBLICATIONS

Machine translation of JP 2005036147 (2005).*
International Search Report issued in PCT/JP2011/055810, dated May 31, 2011.
Office Action dated Feb. 9, 2015, in Chinese Patent Application No. 201180070784.X, with English translation.
English translation of Internatonal Preliminety Report or Patentability and Written Opinion dated Oct. 3, 2013; in PCT International Application No. PCT/JP2011/055810.
Extended European Search Report dated Jul. 8, 2014, in European Patent Application No. 11861297.7.

* cited by examiner

*Primary Examiner* — John D Freeman
(74) *Attorney, Agent, or Firm* — Birch, Stewart, Kolasch & Birch, LLP

(57) ABSTRACT

A sheet for forming a shoe sole, useful for efficiently joining a crosslinked rubber layer as a stud and a thermoplastic elastomer layer as a sole, is provided.
The sheet comprises a resin component (A) containing a polyamide resin (a) and having an amino group concentration of not less than 10 mmol/kg and a flexural modulus of not less than 300 MPa in accordance with ISO178. The polyamide resin (a) may contain a polyamide resin having a melting point of not less than 165° C. at a predetermined concentration (e.g., not less than 30% by weight) in the total polyamide resin (a).

18 Claims, 1 Drawing Sheet

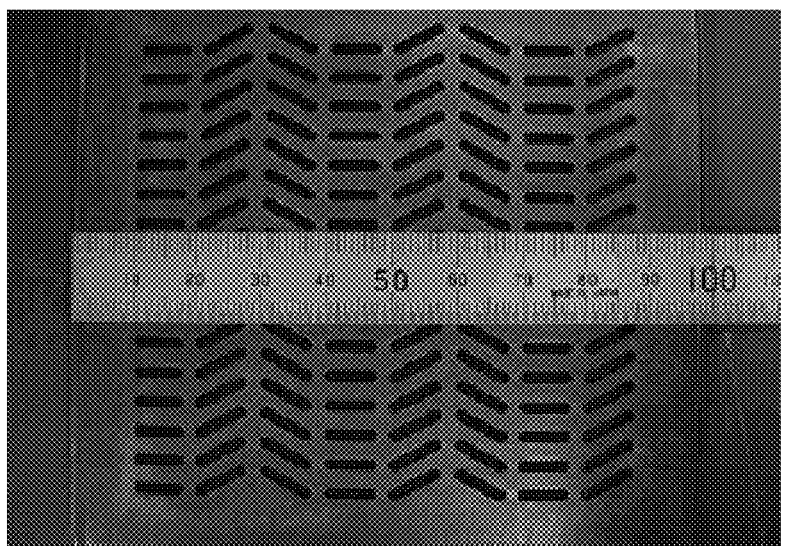

SHEET FOR SHOE SOLE AND SHOE SOLE INCLUDING THE SAME

TECHNICAL FIELD

The present invention relates to a sheet suitable for forming a shoe sole, a shoe sole (or a molded composite article as a shoe sole) including the sheet, and a process for producing the shoe sole.

BACKGROUND ART

As a member for a shoe sole, a soft material which is a crosslinked product of a natural rubber, a synthetic rubber, or the like is often used from the aspect of grip performance or abrasion resistance. A shoe roughly comprises an upper (a part covering a feet), a midsole (a part showing a cushion property), and a shoe sole (a part contacting with the ground). The shoe sole is further divided into a stud (a part projecting from a shoe sole and firmly contacting with the ground) and a sole (a part other than the stud of the shoe sole). A rubber is generally useful for the stud from the aspect of grip performance or abrasion resistance, and a thermoplastic elastomer is generally useful for the sole from the aspect of spring performance.

Heretofore, with respect to the adhesion between the stud and the sole, since it was difficult to ensure a sufficient adhesion strength by an ordinary adhesion method due to a small adhesion area thereof, both of the stud and the sole were usually made of rubber or thermoplastic elastomer in many cases. However, when both of the stud and the sole are made of rubber, the resulting shoe increases in weight due to a large specific gravity of the rubber, which causes a problem that the spring performance is hardly obtained. Whereas, when both of the stud and the sole are made of thermoplastic elastomer, the resulting shoe has a disadvantage for fusion bonding in an artificial turf ground, a gymnasium, or others due to frictional heat or for easy slipping on a wet road surface.

Accordingly, in order to mold (or form) a composite in which a stud is joined to a sole at a sufficient adhesion strength even when the materials for both stud and sole are different from each other, various methods have been attempted. A composite molding by direct adhesion without an adhesive is one of effective methods, by which a shoe sole comprising a stud and a sole joined thereto at a sufficient adhesion strength can be obtained even when the stud comprises a rubber and the sole comprises a thermoplastic elastomer.

For example, Japanese Patent Application Laid-Open Publication No. 8-294933 (JP-8-294933A, Patent Document 1) discloses a process for multi-molding a thermoplastic resin (I) selected from a polyurethane (for example, a polyether urethane, a polyester urethane) and a polyamide-based polymer (for example, a polymer having a polyamide block and a polyether block, such as a polyether ester amide) over a rubber (II), the process comprising halogenating a surface of the rubber and then multi-molding the thermoplastic resin by compression molding or injection molding. This document discloses that the composite material obtained by the process is used for production of sports shoes which have a polyamide elastomer shoe sole having a rubber stud or rubber heel fixed thereon for preventing the shoe sole from abrasion.

Moreover, Japanese Patent Application Laid-Open Publication No. 8-511741 (JP-8-511741A, Patent Document 2) discloses a composite structure comprising a vulcanized elastomer containing a carboxylic acid group, and a thermoplastic polymer containing a block (for example, a polyether ester, a polyurethane ether, a polyurethane ester, and a polyurethane ether ester), wherein the elastomer is directly associated with the polymer. Moreover, this document discloses that the composite structure is useful as a shoe sole for sports shoes.

In composite molding of a rubber and a thermoplastic elastomer, however, a process with heating or pressurizing (such as injection molding or compression molding) is usually adopted, and in particular, defective products due to deformation of the thermoplastic elastomer side becomes a problem. On the contrary, easing of the heating or pressurizing condition causes a problem, such as prolongation of the vulcanizing time of the rubber or imperfect adhesion between the rubber and the thermoplastic elastomer. These documents are silent on a method for solving such a problem. In addition, according to the process described in the Patent Document 1, the pre-treating step, i.e., halogenation of the surface of the rubber, is essential, which is disadvantage when the processing time is desirable to be shortened.

On the other hand, Japanese Patent Application Laid-Open Publication No. 2000-41702 (JP-2000-41702A, Patent Document 3) discloses a shoe sole having a three-layered structure, which is produced by simultaneously integrating an outsole member and a shoe sole body by injection molding a thermoplastic elastomer for the shoe sole body to the outsole member composed of an outsole design part of a synthetic rubber and a thermoplastic elastomer sheet joined and integrated thereto. This document discloses that the shoe sole can be produced by die-cutting a kneaded sheet of an uncrosslinked synthetic rubber to give a member for an outsole design, placing the member in a depressed portion for outsole design of a shoe sole metal mold (or a shoe sole die) for pre-molding, applying pressure and heat to the member, then opening the metal mold at an initial stage of the crosslinking in the member for outsole design, installing a thermoplastic elastomer sheet having a shape practically corresponding to an outer shape of the depressed portion for outsole design, applying pressure and heat again to the member to form an outsole member in which the design part of the synthetic rubber and the thermoplastic elastomer sheet are integrated, trimming the outsole member into the shape of a depressed portion for design of an injection molding metal mold for outsole, clamping the metal mold, then installing the outsole member so as to correspond to the depressed portion for design of the injection molding metal mold for outsole, and then injection molding a thermoplastic elastomer for forming the shoe sole body.

However, this document is also silent on a method for solving the problem of composite molding as described above. Moreover, according to this document, it is necessary for joining and integrating of the outsole design part and the outsole member to stop the crosslinking step of the synthetic rubber, open the metal mold, install the thermoplastic elastomer sheet, and then close the metal mold. The set of steps become problems when the increase in operating efficiency is desired. Furthermore, in injection-molding the thermoplastic elastomer for forming the shoe sole body to the outsole member, heat-fusing (fusing integration) requires use of substantially the same kind of resin as the resin for outsole member and the thermoplastic elastomer. Thus the combination of the resin materials is limited.

RELATED ART DOCUMENTS

Patent Documents

Patent Document 1: JP-8-294933A (Claims and Paragraph [0001])

Patent Document 2: JP-8-511741A (Claims and page 12, lines 2 to 5)
Patent Document 3: JP-2000-41702A (Claims and Paragraphs [0025] to [0029])

SUMMARY OF THE INVENTION

Problems to be Solved by the Invention

It is therefore an object of the present invention to provide a sheet (a sheet for (forming) a shoe sole) useful for efficiently joining a crosslinked rubber layer as a stud and a thermoplastic elastomer layer as a sole, and a molded composite article as a shoe sole (or a shoe sole) prepared (or obtained) with the sheet, as well as a process for producing the molded composite article as a shoe sole.

It is another object of the present invention to provide a sheet useful for joining a stud and a sole at a high workability without deformation of the stud and the sole, and a molded composite article as a shoe sole (or a shoe sole) prepared (or obtained) with the sheet, as well as a process for producing the molded composite article as a shoe sole.

Means to Solve the Problems

The inventors of the present invention made intensive studies to achieve the above objects and finally found that interposition of a sheet formed from a specific resin component having a specific amino group concentration and a specific flexural modulus between a crosslinked rubber layer as a stud (member) and a thermoplastic elastomer layer as a sole (member) unexpectedly achieves both prevention or inhibition of deformation of the sheet or the thermoplastic elastomer layer and joining of both layers without a surface treatment (for example, halogenation treatment) of the crosslinked rubber layer or without a complicated process as described in Patent Document 3, and that use of the sheet achieves joining of the crosslinked rubber layer and the thermoplastic elastomer layer in a wide-ranging combinations of the rubber and the thermoplastic elastomer. The present invention was accomplished based on the above findings.

That is, the sheet (sheet for a shoe sole) according to the present invention is a sheet for forming a molded composite article as a shoe sole (or a shoe sole), wherein the molded composite article comprises a crosslinked rubber layer as a stud, a thermoplastic elastomer layer as a sole, and the sheet interposed between the crosslinked rubber layer and the thermoplastic elastomer layer, being in directly contact with these layers (or a sheet for forming a molded composite article as a shoe sole, wherein the sheet has a first side at which a crosslinked rubber layer as a stud is directly formed and a second side at which a thermoplastic elastomer layer as a sole is directly formed). The sheet comprises a resin component (A) containing a polyamide resin (a), and the resin component (A) has an amino group concentration of not less than 10 mmol/kg and a flexural modulus of not less than 300 MPa in accordance with ISO178.

The polyamide resin (a) may comprise at least one member selected from the group consisting of a polyamide (such as an aliphatic polyamide or an alicyclic polyamide) and a polyamide elastomer. Moreover, the polyamide resin (a) may comprise a polyamide resin having a relatively high melting point (e.g., a melting point of not lower than 165° C.). The proportion of the polyamide resin having such a high melting point may be about not less than 30% by weight in the total polyamide resin (a).

The resin component (A) (or the polyamide resin (a)) may be representatively any one of the following (1) to (3):

(1) a polyamide resin alone, having an amino group concentration of not less than 10 mmol/kg, a melting point of not lower than 165° C., a flexural modulus of not less than 300 MPa in accordance with ISO178, (2) a polyamide resin composition comprising a plurality of polyamides, which comprises a polyamide having a melting point of not lower than 165° C. at a proportion of not less than 30% by weight and satisfies, as a whole, an amino group concentration of not less than 10 mmol/kg and a flexural modulus of not less than 300 MPa in accordance with ISO178, (3) a resin composition comprising a polyamide and a polyamide elastomer, wherein not less than 30% by weight of the polyamide and/or the polyamide elastomer has a melting point of not lower than 165° C., the resin composition satisfies, as a whole, an amino group concentration of not less than 10 mmol/kg and a flexural modulus of not less than 300 MPa in accordance with ISO178.

In particular, the resin component (A) (or the polyamide resin (a)) may be the polyamide resin composition (3). In the polyamide resin composition (3), the polyamide elastomer may have an amino group concentration of not less than 10 mmol/kg.

The sheet may further comprise a filler. Moreover, the sheet may have a thickness of about 0.1 to 0.7 mm.

The present invention also includes a molded composite article as a shoe sole (or a shoe sole), which comprises the sheet, a crosslinked rubber layer as a stud, laminated on (or being in directly contact with) a first side of the sheet, and a thermoplastic elastomer layer as a sole, laminated on (or being in directly contact with) a second side of the sheet.

In the molded composite article as a shoe sole, the crosslinked rubber layer may be, in particular, formed by crosslinking an uncrosslinked rubber composition containing an uncrosslinked rubber and a peroxide (or may be a crosslinked product of an unvulcanized rubber composition). The uncrosslinked rubber composition may further comprise a crosslinking auxiliary.

Moreover, the thermoplastic elastomer layer may comprise, for example, at least one member selected from the group consisting of a polyurethane elastomer and a polyamide elastomer. In particular, the thermoplastic elastomer layer may comprise a polyurethane elastomer.

Further, the present invention includes a process for producing a molded composite article as a shoe sole (or a shoe sole), which comprises directly forming a crosslinked rubber layer at a first side of the sheet and directly forming a thermoplastic elastomer layer at a second side of the sheet. In the process, representatively, the molded composite article may be produced by allowing a molten uncrosslinked rubber composition to contact with the first side of the sheet in a metal mold, and crosslinking the uncrosslinked rubber composition under heating to form the crosslinked rubber layer. In the process, particularly, the crosslinked rubber layer may be formed without opening the metal mold.

Furthermore, in the process, the uncrosslinked rubber composition may be crosslinked (or the crosslinking may be conducted) without melting the sheet (or the polyamide resin (a) or the resin component (A)). Representatively, in the process, the sheet may comprise a polyamide resin having a melting point of not lower than 165° C. at a proportion of not less than 30% by weight in the polyamide resin (a), and the crosslinking may be conducted at a temperature lower than the melting point of the polyamide resin having a melting point of not lower than 165° C. [for example, at a temperature of not lower than 150° C. (e.g., 150 to 190° C.) to at least 5° C. lower than the melting point of the polyamide resin having a melting point of not lower than 165° C.]. According to the present invention, use of the sheet comprising a specific resin component as described above achieves firm adhesion to a rubber layer (further a thermoplastic elastomer layer) without necessarily melting the sheet, and deformation due to molding can be prevented or inhibited efficiently.

The present invention also includes shoes (for example, athletic shoes) provided with the molded composite article as a shoe sole (or a shoe sole).

Effects of the Invention

The sheet (the sheet for a shoe sole) of the present invention is useful for efficiently joining a crosslinked rubber layer as a stud and a thermoplastic elastomer layer as a sole. Specifically, the use of the sheet achieves efficient joining of the stud and the sole without deformation. In particular, the use of the sheet of the present invention allows integral molding of the crosslinked rubber layer and the thermoplastic elastomer without applying the complicated process as described in the Patent Document 3. Moreover, since the present invention does not require a surface treatment (for example, a halogenation treatment) of the crosslinked rubber layer, the stud and the sole can be joined together at a high workability without deformation.

BRIEF DESCRIPTION OF DRAWINGS

FIG. 1 is a photograph of a metal mold for rubber (a metal mold for rubber molding) used in Examples.

DESCRIPTION OF EMBODIMENTS

[Sheet]

The sheet of the present invention comprises a resin component (sometimes referred to as a resin component (A)) containing a polyamide resin (sometimes referred to as a polyamide resin (a)). The resin component for the sheet has a specific amino group concentration and a specific flexural modulus. The sheet of the present invention is particularly useful as a sheet for a shoe sole as described below.

The polyamide resin may include a polyamide, a polyamide elastomer, and others.

The polyamide may encompass an aliphatic polyamide resin, an alicyclic polyamide resin, an aromatic polyamide resin, and others. The polyamide may be a homopolyamide or a copolyamide.

Among the aliphatic polyamide resins, as the homopolyamide, there may be mentioned a homo- or copolyamide of an aliphatic diamine component (for example, a $C_{4-16}$alkylenediamine such as tetramethylendiamine, hexamethylenediamine, or dodecanediamine, preferably a $C_{6-14}$alkylenediamine, and more preferably a $C_{6-12}$alkylenediamine) and an aliphatic dicarboxylic acid component (for example, a $C_{4-20}$alkanedicarboxylic acid such as adipic acid, sebacic acid, or dodecanedioic acid, preferably a $C_{5-16}$alkanedicarboxylic acid, and more preferably a $C_{6-14}$alkanedicarboxylic acid)], a homo- or copolyamide of a lactam [e.g., a lactam having about 4 to 20 carbon atoms (preferably about 4 to 16 carbon atoms), such as ε-caprolactam or ω-laurolactam)] or an aminocarboxylic acid (for example, a $C_{4-20}$-aminocarboxylic acid such as ω-aminoundecanoic acid, preferably a $C_{4-16}$aminocarboxylic acid, and more preferably a $C_{6-14}$aminocarboxylic acid), a copolyamide of an aliphatic diamine component, an aliphatic dicarboxylic acid component, and a lactam or an aminocarboxylic acid, and others.

Concrete examples of the aliphatic polyamide may include a polyamide 46, a polyamide 66, a polyamide 610, a polyamide 612, a polyamide 613, a polyamide 1010, a polyamide 6, a polyamide 11, a polyamide 12, a polyamide 611, a polyamide 612, a polyamide 66/11, a polyamide 66/12, and a polyamide 6/12/612.

The preferred aliphatic polyamide may include a polyamide 11, a polyamide 12, a polyamide 610, a polyamide 612, a polyamide 613, a polyamide 1012, a polyamide 1010, a polyamide 1212, and others.

As the alicyclic polyamide resin, there may be mentioned a homopolyamide or copolyamide containing at least one member selected from at least an alicyclic diamine component and an alicyclic dicarboxylic acid component as a constituent. For example, there may be used an alicyclic polyamide obtained from an alicyclic diamine and/or an alicyclic dicarboxylic acid used as at least part of a diamine component and a dicarboxylic acid component. In particular, as a diamine component and a dicarboxylic acid component, it is preferable that the above-exemplified aliphatic diamine component and/or aliphatic dicarboxylic acid component be used in combination with the alicyclic diamine component and/or the alicyclic dicarboxylic acid component. The alicyclic polyamide resin has a high transparency and is known as what is called a transparent polyamide.

The alicyclic diamine component may include a diaminocycloalkane such as diaminocyclohexane (e.g., a diamino$C_{5-10}$cycloalkane); a bis(aminocycloalkyl)alkane such as bis(4-aminocyclohexyl) methane, bis(4-amino-3-methylcyclohexyl) methane, or 2,2-bis(4'-aminocyclohexyl) propane [e.g., a bis(amino$C_{5-8}$cycloalkyl)$C_{1-3}$alkane]; a hydrogenated xylylenediamine; and others. The alicyclic diamine component may have a substituent such as an alkyl group (a $C_{1-6}$alkyl group such as methyl group or ethyl group, preferably a $C_{1-4}$alkyl group, and more preferably a $C_{1-2}$alkyl group). Moreover, the alicyclic dicarboxylic acid may include a cycloalkanedicarboxylic acid such as cyclohexane-1,4-dicarboxylic acid or cyclohexane-1,3-dicarboxylic acid (e.g., a $C_{5-10}$cycloalkane-dicarboxylic acid), and others.

Among the alicyclic polyamide resins, a condensed product (a homo- or copolyamide) of an aliphatic dicarboxylic acid component and an alicyclic diamine component, and the like are preferred. Representative examples of the alicyclic polyamide resin (an alicyclic polyamide resin containing an alicyclic diamine and an aliphatic dicarboxylic acid as constituents) may encompass an alicyclic polyamide represented by the following formula (1):

[Chem. 1]

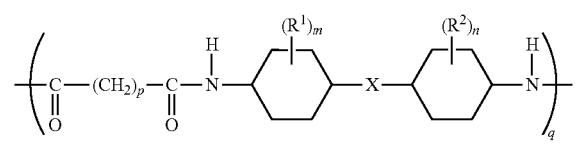

(1)

wherein X represents a direct bond, an alkylene group, or an alkenylene group; $R^1$ and $R^2$ are the same or different and each represent a substituent; each of m and n denotes an integer of 0 or 1 to 4; and each of p and q denotes an integer of not less than 1.

In the formula (1), the alkylene group (or alkylidene group) represented by the group X may include a $C_{1-6}$alkylene group (or alkylidene group) such as methylene, ethylene, ethylidene, propylene, propane-1,3-diyl, 2-propylidene, or butylene, preferably a $C_{1-4}$alkylene group (or alkylidene group), and more preferably a $C_{1-3}$alkylene group (or alkylidene group). Moreover, the alkenylene group represented by the group X may include a $C_{2-6}$alkenylene group such as vinylene or propenylene, preferably a $C_{2-4}$alkenylene group, and others.

The substituents $R^1$ and $R^2$ may encompass, for example, a hydrocarbon group such as an alkyl group. As the alkyl group, there may be mentioned, for example, a $C_{1-6}$alkyl group such as methyl, ethyl, propyl, isopropyl, or butyl group, preferably a $C_{1-4}$alkyl group, and more preferably a $C_{1-2}$alkyl group.

Each of the number m of $R^1$ and the number n of $R^2$ may be selected from integers of 0 or 1 to 4 and may usually be an integer of 0 or 1 to 3, preferably an integer of 0 or 1 to 2, and more preferably 0 or 1. Moreover, each of the position of the substituent $R^1$ and that of the substituent $R^2$ can usually be selected from 2-position, 3-position, 5-position, and 6-position with respect to an amide group and may be preferably 2-position, 6-position.

In the formula (1), the number p may for example be not less than 4 (e.g., about 4 to 30), preferably not less than 6 (e.g., about 6 to 20), and more preferably not less than 8 (e.g., about 8 to 15). Moreover, in the formula (1), the number q (the degree of polymerization) may for example be not less than 5 (e.g., about 10 to 1000), preferably not less than 10 (e.g., about 30 to 800), and more preferably not less than 50 (e.g., about 100 to 500).

The aromatic polyamide resin may include a polyamide comprising an aromatic component in place of at least one component of the aliphatic diamine component and the aliphatic dicarboxylic acid component in the above-mentioned aliphatic polyamide, for example, a polyamide in which a diamine component is an aromatic component [for example, a condensation product of an aromatic diamine (such as metaxylylenediamine) and an aliphatic dicarboxylic acid, e.g., MXD-6], and a polyamide in which a dicarboxylic acid component is an aromatic component [for example, a condensation product of an aliphatic diamine (such as trimethylhexamethylenediamine) and an aromatic dicarboxylic acid (such as terephthalic acid or isophthalic acid)].

The aromatic polyamide resin may be a fully aromatic polyamide (aramid) such as a polyamide in which a diamine component and a dicarboxylic acid component are aromatic components [e.g., a poly(m-phenyleneisophthalamide)].

Further, the polyamide resin may be a modified polyamide, e.g., a polyamide containing a dimer acid as a dicarboxylic acid component, and a polyamide having a branched chain structure introduced therein.

The preferred polyamide may include an aliphatic polyamide (in particular, a polyamide 12), an alicyclic polyamide, and others.

The polyamides may be used alone or in combination.

Incidentally, in many cases, the polyamide has a relatively large flexural modulus in accordance with ISO178 compared with a polyamide elastomer and others. The polyamide may have a flexural modulus of, for example, not less than 300 MPa (e.g., not less than 500 MPa), preferably not less than 600 MPa (e.g., about 700 to 5000 MPa), more preferably not less than 700 MPa (e.g., about 800 to 3500 MPa), and particularly not less than 900 MPa (e.g., about 1000 to 3000 MPa) in accordance with ISO178. Thus, when the resin component (A) comprises at least a polyamide, the flexural modulus is easily be adjusted within a range as defined in the present invention.

Moreover, as described above, the polyamide resin also includes a polyamide elastomer. As the polyamide elastomer (polyamide block copolymer), there may be mentioned a polyamide block copolymer having a polyamide as a hard segment (or a hard block) and a soft segment (or a soft block), for example, a polyamide-polyether block copolymer, a polyamide-polyester block copolymer, and a polyamide-polycarbonate block copolymer.

Representative examples of the polyamide elastomer may include a polyamide-polyether block copolymer. In the polyamide-polyether block copolymer, the polyether (polyether block) may encompass, for example, a polyalkylene glycol (e.g., a poly$C_{2-6}$alkylene glycol such as a polyethylene glycol, a polypropylene glycol, or a polytetramethylene glycol, and preferably a poly$C_{2-4}$alkylene glycol).

Examples of the polyamide-polyether block copolymer may include a block copolymer obtainable by copolycondensation of a polyamide block having a reactive terminal group and a polyether block having a reactive terminal group, for example, a polyether amide [e.g., a block copolymer of a polyamide block having a diamine terminal and a polyalkylene glycol block having a dicarboxyl terminal (or a polyoxyalkylene block), and a block copolymer of a polyamide block having a dicarboxyl terminal and a polyalkylene glycol block (or a polyoxyalkylene block) having a diamine terminal], and a polyether ester amide [e.g., a block copolymer of a polyamide block having a dicarboxyl terminal and a polyalkylene glycol block (or a polyoxyalkylene block) having a dihydroxy terminal]. Incidentally, a commercially available polyamide elastomer has no or few amino groups in many cases.

The polyamide elastomers may be used alone or in combination.

In the polyamide elastomer (the polyamide block copolymer), the number-average molecular weight of the soft segment (e.g., a polyether block, a polyester block, and a polycarbonate block) can be, for example, selected from the range of about 100 to 10000 and may be preferably about 300 to 6000 (e.g., about 300 to 5000), more preferably about 500 to 4000 (e.g., about 500 to 3000), and particularly about 1000 to 2000.

Moreover, in the polyamide block copolymer, the ratio (weight ratio) of the polyamide block (polyamide segment) relative to the soft segment block may for example be about 95/5 to 20/80, preferably about 90/10 to 30/70, more preferably about 80/20 to 40/60, and particularly about 75/25 to 50/50 (e.g., about 73/27 to 55/45) as a ratio of the former/the latter.

Incidentally, the polyamide elastomer may have a Shore D hardness of, for example, about 40 to 80, preferably about 45 to 75, and more preferably about 50 to 65. The Shore D hardness can be measured in accordance with ASTM D2240 or the like.

The polyamide resin may have a number-average molecular weight of, for example, about 8000 to 200000, preferably about 9000 to 150000, and more preferably about 10000 to 100000.

The polyamide resin may have a melting point of, for example, about 80° C. to 300° C., preferably about 90° C. to 280° C., and more preferably about 100° C. to 260° C. In particular, according to the present invention, as described below, it is preferred to use a resin component at least containing a polyamide resin (for example, an aliphatic polyamide) having a relatively high melting point [for example, a melting point of not lower than 165° C. (e.g., about 165 to 280° C., preferably about 170 to 260° C., and more preferably about 175 to 250° C.), particularly a melting point of not lower than 170° C. (e.g., about 175 to 260° C.)]. Among the above-mentioned resins, the polyamide resin having such a high melting point may include a polyamide (e.g., an aliphatic polyamide such as a polyamide 612, a polyamide 12, or a polyamide 1012, and an alicyclic polyamide), a polyamide elastomer having a relatively small ratio of the soft segment, and others. The polyamides having a high melting point may be used alone or in combination. Incidentally, depending on the ratio or kind of the hard segment, the polyamide elastomer (for example, a polyamide elastomer containing a polyamide 12 as a hard segment) often has a relatively low melting point (for example, a melting point of lower than 165° C.).

The proportion of the polyamide resin having such a high melting point (e.g., a melting point of not lower than 165° C.) in the total polyamide resin (a) may for example be not less than 20% by weight (e.g., about 25 to 100% by weight), preferably not less than 30% by weight (e.g., about 35 to 100% by weight), more preferably not less than 40% by weight (e.g., about 45 to 100% by weight), and usually not less than 50% by weight (e.g., about 55 to 100% by weight) and may particularly be not less than 60% by weight (preferably not less than 70% by weight).

Incidentally, when the polyamide resin (a) comprises a plurality of polyamide resins, each having a melting point of not lower than 165° C., the above-mentioned proportion means a total proportion of these resins. Moreover, when a polyamide resin having a melting point of not lower than 165° C. and a polyamide resin (e.g., a polyamide elastomer) having a melting point of lower than 165° C. are used in combination, the ratio of these resins as a weight ratio of the former/the latter may for example be about 99/1 to 20/80 (e.g., about 98/2 to 25/75), preferably about 97/3 to 30/70 (e.g., about 95/5 to 35/65), more preferably about 93/7 to 40/60 (e.g., about 90/10 to 45/55), and particularly about 85/15 to 50/50 (e.g., about 80/20 to 55/45) or may usually be about 95/5 to 60/40 (e.g., about 93/7 to 65/35 and preferably about 90/10 to 70/30).

The polyamide resins may be used alone or in combination. The combination of not less than two kinds of polyamide resins (for example, a combination of not less than two kinds of polyamides, and a combination of one or not less than two of polyamide(s) and one or not less than two of polyamide elastomer(s)) allows an amino group concentration or a flexural modulus (then adhesion to a rubber and/or a thermoplastic elastomer, or deformation) to be controlled easily. In particular, since the polyamide elastomer generally has a low flexural modulus or a low melting point and easily achieves improvement in adhesion while the polyamide elastomer is easily deformed, the combination of the polyamide elastomer with the polyamide easily achieves both excellent adhesion and less deformation.

The resin component constituting the sheet may comprise the polyamide resin (a) alone or may comprise another resin in addition to the polyamide resin (a). Another resin is not particularly limited to a specific one and may include, for example, a thermoplastic elastomer other than the polyamide resin, e.g., a polyurethane elastomer, a polyester elastomer, a polyolefin elastomer, a polystyrene elastomer, a fluorine-containing elastomer, and an ethylene-vinyl acetate copolymer. These resins (other than the polyamide resin (a)) may be used alone or in combination.

When the resin component contains another resin, the ratio of another resin relative to 100 parts by weight of the polyamide resin (a) may for example be not more than 100 parts by weight (e.g., about 1 to 80 parts by weight), preferably not more than 70 parts by weight (e.g., about 2 to 60 parts by weight), more preferably not more than 50 parts by weight (e.g., about 2 to 40 parts by weight), and particularly not more than 30 parts by weight (e.g., about 3 to 20 parts by weight).

The sheet of the present invention is characterized by a resin component having a specific amino group concentration and a specific flexural modulus as the resin component (A). The sheet comprising the specific resin component has an excellent adhesion to both a rubber layer and a thermoplastic elastomer layer while having a relatively strong resistance to deformation.

It is sufficient that such a resin component (A) has an amino group concentration of not less than 10 mmol/kg (e.g., about 10 to 300 mmol/kg). The amino group concentration of the resin component (A) may for example be not less than 15 mmol/kg (e.g., about 25 to 200 mmol/kg), preferably not less than 30 mmol/kg (e.g., about 35 to 150 mmol/kg), more preferably not less than 40 mmol/kg (e.g., about 45 to 120 mmol/kg), particularly not less than 50 mmol/kg (e.g., about 55 to 100 mmol/kg), and particularly preferably not less than 60 mmol/kg (e.g., about 62 to 100 mmol/kg) or may usually be about 10 to 100 mmol/kg (e.g., about 12 to 90 mmol/kg, preferably about 15 to 80 mmol/kg, and more preferably about 20 to 70 mmol/kg).

Incidentally, the above-mentioned amino group concentration is a concentration in the total resin component (A). For example, when the resin component (A) comprises a plurality of polyamide resins, the amino group concentration means a total amino group concentration of the polyamide resin composition; all polyamide resins may have the above-mentioned amino group concentration, or one or some of the polyamide resins may have the above-mentioned amino group concentration. The amino group is usually contained in the polyamide resin itself. The amino group concentration can also be adjusted by adding a compound having an amino group (a compound other than the polyamide resin) to the resin component (A).

The compound having an amino group (an amino group-containing compound having a high amino group concentration and a relatively low molecular weight) may include a monoamine (e.g., an aliphatic, alicyclic, or aromatic monoamine having 2 to 24 carbon atoms), a polyamine [for example, a diamine (the above-mentioned aliphatic diamine, alicyclic diamine, and aromatic diamine), and a polyalkylenepolyamine such as diethylenetriamine or triethylenetetramine], a polyamide oligomer (specifically, a polyamide oligomer having a free amino group in a molecular end and/or a branched chain thereof), and others. These compounds having an amino group may be used alone or in combination.

The ratio of the compound having an amino group relative to 100 parts by weight of the polyamide resin (specifically, the polyamide resin as a base resin) may for example be about 0.01 to 30 parts by weight, preferably about 0.02 to 20 parts by weight, and more preferably about 0.03 to 15 parts by weight or may usually be not more than 10 parts by weight [e.g., about 0.05 to 8 parts by weight, and preferably not more than 5 parts by weight (e.g., about 0.1 to 3 parts by weight)].

Among these compounds having an amino group, a polyamide oligomer is particularly preferred. Incidentally, the polyamide oligomer means a polyamide having a low molecular weight. As the polyamide oligomer, there may be used a polyamide having a relatively low molecular weight which is obtained by a conventional method, for example, obtained from the above-exemplified polyamide component (e.g., a diamine component, a dicarboxylic acid component, a lactam, and an aminocarboxylic acid) under adjusted monomer formulation, polycondensation condition, or others.

The polyamide oligomer may have a number-average molecular weight of, for example, less than 8000 (e.g., about 200 to 7500), preferably about 500 to 7000, and more preferably about 1000 to 5000 or may usually have a number-average molecular weight of about 2000 to 6500 (e.g., about 2500 to 6000). The amino group of the polyamide oligomer may be in at least one end of a main chain of the polyamide oligomer or both ends of a main chain thereof or may be in a branched chain thereof.

The amino group concentration of the polyamide oligomer may for example be about 100 to 4000 mmol/kg, preferably about 120 to 3000 mmol/kg, and more preferably about 200 to 2000 mmol/kg or may usually be about 150 to 1500 mmol/kg.

In particular, the ratio (the amount to be used) of the polyamide oligomer relative to 100 parts by weight of the polyamide resin may be about 0.01 to 20 parts by weight, preferably about 0.1 to 15 parts by weight, and more preferably about 0.5 to 10 parts by weight.

Incidentally, as described above, the resin component (A) has an amino group. With respect to such an amino group, the amino group contained in the polyamide resin (further, the polyamide oligomer) may be in any position such as a molecular chain end a side chain. In terms of adhesion, it is preferable that the amino group is contained in a molecular chain end. Moreover, as described above, the polyamide resin itself has an amino group in many cases. In particular, use of a polyamide elastomer having an amino group at a predetermined concentration (not less than 10 mmol/kg) is further advantageous in terms of adhesion or prevention or inhibition of deformation.

Moreover, it is sufficient that the flexural modulus of the resin component (A) in accordance with ISO178 may be not less than 300 MPa (for example, about 300 to 5000 MPa), and may be preferably not less than 400 MPa (for example, about 450 to 3500 MPa), more preferably not less than 500 MPa (for example, about 550 to 3000 MPa), particularly not less than 600 MPa (for example, about 600 to 2800 MPa) and may usually be about 500 to 3000 MPa (for example, about 600 to 2500 MPa). Incidentally, in the same manner as in the amino group concentration, the above-mentioned flexural modulus means a total concentration of the resin component (A). For example, when the resin component (A) comprises a plurality of polyamide resins, the above-mentioned flexural modulus means a total flexural modulus of a resin composition containing these polyamide resins.

Representative examples of the resin component (A) (or the polyamide resin (a)) may include the following (1) to (3).

(1) A polyamide resin alone having an amino group concentration of not less than 10 mmol/kg, a melting point of not lower than 165° C., and a flexural modulus in accordance with ISO178 of not less than 300 MPa (for example, a polyamide alone and a polyamide elastomer alone)

When the above-mentioned polyamide resin is a polyamide alone, the flexural modulus in accordance with ISO178 is relatively large in many cases as described above [for example, not less than 600 MPa (e.g., about 700 to 5000 MPa, preferably about 800 to 3500 MPa, and more preferably about 1000 to 3000 MPa)].

On the other hand, when the polyamide resin is a polyamide elastomer alone, or the like, the flexural modulus in accordance with ISO178 is relatively small in some cases within the range in which the present invention is satisfied [for example, less than 600 MPa (e.g., about 300 to 580 MPa), preferably not more than 550 MPa (e.g., about 310 to 530 MPa), more preferably not more than 500 MPa (e.g., about 320 to 480 MPa), and particularly not more than 450 MPa (e.g., about 330 to 420 MPa) 1. When the flexural modulus is relatively small, a polyamide resin (in particular, a polyamide elastomer) having a very high melting point [for example, a melting point of not lower than 180° C. (e.g., about 180 to 280° C., preferably about 185 to 250° C., and more preferably about 190 to 220° C.), preferably a melting point of not lower than 190° C., and more preferably a melting point of not lower than 200° C.] may be used preferably.

(2) A resin composition comprising a plurality of polyamides, wherein the polyamide resin composition comprises a polyamide having a melting point of not lower than 165° C. in a proportion of not less than 30% by weight and satisfies, as a whole, an amino group concentration of not less than 10 mmol/kg and a flexural modulus in accordance with ISO178 of not less than 300 MPa In the plurality of polyamides, all polyamides may have an amino group of not less than 10 mmol/kg, or a polyamide having an amino group concentration of less than 10 mmol/kg may be contained.

Representative examples of the resin composition (2) may include (2a) a polyamide resin composition which contains a plurality of polyamides each having a melting point of not lower than 165° C. and a flexural modulus in accordance with ISO178 of not less than 300 MPa (in particular, not less than 600 MPa) and has an amino group concentration of not less than 10 mmol/kg as a whole.

(3) A resin composition comprising a polyamide (one or more polyamide(s)) and a polyamide elastomer (one or more polyamide elastomer(s)), wherein not less than 30% by weight of the polyamide and/or the polyamide elastomer has a melting point of not lower than 165° C., and the polyamide resin composition satisfies, as a whole, an amino group concentration of not less than 10 mmol/kg and a flexural modulus in accordance with ISO178 of not less than 300 MPa In the above-mentioned polyamide resin composition, all of the polyamide and the polyamide elastomer may have an amino group of not less than 10 mmol/kg, or the polyamide resin composition may contain a polyamide or polyamide elastomer having an amino group concentration of less than 10 mmol/kg. In particular, as the polyamide elastomer, it is preferred to use a polyamide elastomer having an amino group concentration of not less than 10 mmol/kg.

Representative examples of the above-mentioned resin composition (3) may include the following resin compositions (3a) to (3d).

(3a) A polyamide resin composition which comprises one or more polyamide(s) (a1) having a melting point of not lower than 165° C. and a flexural modulus in accordance with ISO178 of not less than 300 MPa (in particular, not less than 600 MPa) and one or more polyamide elastomer(s) (a2) having a melting point of lower than 165° C. and a flexural modulus in accordance with ISO178 of less than 300 MPa, wherein the polyamide resin composition contains the polyamide(s) (a1) in a proportion of not less than 30% by weight and satisfies, as a whole, an amino group concentration of not less than 10 mmol/kg and a flexural modulus in accordance with ISO178 of not less than 300 MPa (3b) A polyamide resin composition which comprises one or more polyamide(s) (b1) having a melting point of not lower than 165° C. and a flexural modulus in accordance with ISO178 of not less than 300 MPa (in particular, not less than 600 MPa) and one or more polyamide elastomer(s) (b2) having a melting point of not lower than 165° C. and a flexural modulus in accordance with ISO178 of less than 300 MPa, wherein the polyamide resin composition satisfies, as a whole, an amino group concentration of not less than 10 mmol/kg and a flexural modulus in accordance with ISO178 of not less than 300 MPa (3c) A polyamide resin composition which comprises one or more polyamide(s) (c1) having a melting point of not lower than 165° C. and a flexural modulus in accordance with ISO178 of not less than 300 MPa (in particular, not less than 600 MPa) and one or more polyamide elastomer(s) (c2) having a melting point of lower than 165° C. and a flexural modulus in accordance with ISO178 of not less than 300 MPa, wherein the polyamide resin composition contains the polyamide(s) (c1) in a proportion of not less than 30% by weight and satisfies, as a whole, an amino group concentration of not less than 10 mmol/kg (3d) A polyamide resin composition which comprises one or more polyamide(s) (d1) having a melting point of not lower than 165° C. and a flexural modulus in accordance with ISO178 of not less than 300 MPa (in particular, not less than 600 MPa) and one or more polyamide elastomer(s) (d2) having a melting point of not lower than 165° C. and a flexural modulus in accordance with ISO178 of not less than 300 MPa, wherein the polyamide resin composition satisfies an amino group concentration of not less than 10 mmol/kg as a whole.

Among the above-mentioned resin compositions (3) (or (3a) to (3d)), in particular, it is preferable that the polyamide elastomer (or polyamide elastomers (a2) to (d2)) have an amino group concentration of not less than 10 mmol/kg.

The sheet of the present invention may contain a component other than the resin component (A) in the range that an advantage of the present invention is not deteriorated; the component may include, for example, an additive such as a filler (or a reinforcer), a stabilizer (such as an ultraviolet ray absorbing agent, an antioxidant, or a heat stabilizer), a coloring agent, a plasticizer, a lubricant, a flame retardant, or an antistatic agent. These additives may be used alone or in combination. Among them, in particular, addition of filler to the sheet allows the flexural modulus of the sheet itself to be further improved.

The filler (filling material) may encompass a fibrous filler, a non-fibrous filler (e.g., a particulate or plate-like filler), and others. The fibrous filler may include, for example, an organic fiber (e.g., a natural fiber), an inorganic fiber (e.g., a glass fiber, an asbestos fiber, a carbon fiber, a silica fiber, a silica-alumina fiber, a wollastonite, a zirconia fiber, and a potassium titanate fiber), and a metal fiber.

Moreover, the non-fibrous filler may include, for example, a mineral particle (e.g., a talc, a mica, a baked diatomite, a kaolin, a sericite, a bentonite, a smectite, a clay, a silica, a quartz powder, a glass bead, a glass powder, a glass flake, a milled fiber, and a wollastonite), a boron-containing compound (boron nitride, boron carbide, and titanium boride), a metal carbonate (e.g., magnesium carbonate, heavy calcium carbonate, and light calcium carbonate), a metal silicate (e.g., calcium silicate, aluminum silicate, magnesium silicate, and magnesium aluminosilicate), a metal oxide (e.g., magnesium oxide), a metal hydroxide (e.g., aluminum hydroxide, calcium hydroxide, and magnesium hydroxide), a metal sulfate (e.g., calcium sulfate and barium sulfate), a metal carbide (e.g., silicon carbide, aluminum carbide, and titanium carbide), a metal nitride (e.g., aluminum nitride, silicon nitride, and titanium nitride), a white carbon, and various metal foils. These non-fibrous fillers may be used alone or in combination.

The fibrous filler may have an average fiber length of, for example, about 0.1 to 10 mm, preferably about 0.3 to 7 mm, and more preferably about 0.5 to 5 mm. Moreover, the fibrous filler may have an average fiber diameter of, for example, about 0.1 to 50 μm, preferably about 0.5 to 30 μm, and more preferably 1 to 10 μm. The non-fibrous filler (particulate filler) may have an average particle size of, for example, about 0.1 to 10 μm, preferably about 0.3 to 5 μm, and more preferably about 0.5 to 5 μm.

When the additive (non-resin component) is used, the ratio of the additive relative to 100 parts by weight of the resin component (A) may be not more than 50 parts by weight (for example, about 0.01 to 40 parts by weight), preferably not more than 30 parts by weight (for example, about 0.1 to 25 parts by weight), and more preferably not more than 20 parts by weight (for example, about 1 to 18 parts by weight).

In particular, when the filler is used, the ratio of the resin component (A) relative to the filler as a ratio of the former/the latter (volume ratio) may for example be about 99/1 to 70/30 (e.g., about 99/1 to 75/25), preferably about 98/2 to 80/20 (e.g., about 97/3 to 85/15), and more preferably about 96/4 to 90/10. Moreover, the ratio of the resin component (A) relative to the filler as a ratio of the former/the latter (weight ratio) may for example be about 99/1 to 40/60 (e.g., about 98/2 to 50/50), preferably about 97/3 to 60/40 (e.g., about 96/4 to 70/30), and more preferably about 95/5 to 75/25 or may usually be about 99/1 to 80/20 (e.g., about 97/3 to 85/15).

The thickness of the sheet is not particularly limited to a specific one. The thickness of the sheet may for example be not more than 2 mm (e.g., about 0.05 to 1.5 mm), preferably about 0.07 to 1 mm, and more preferably about 0.1 to 0.7 mm or may usually be about 0.15 to 0.8 mm (e.g., about 0.2 to 0.75 mm). For a sheet having a small thickness as described above, since the sheet can be in closely contact with a sole according to the shape of the sole while maintaining the strength of the sheet, effects of the direct joining can further be heightened. Moreover, even if the resin component has a relatively low transparency, the sheet can often obtain a certain level of light transmittance properties. Thus, for example, the pattern or color of the sole can be seen through the sheet, which can increase a design variation of a shoe sole.

The sheet of the present invention can be obtained by sheet-forming the resin component (further, if necessary, a composition containing an additive) with a conventional method. The sheet-forming method is not particularly limited to a specific one. For example, extrusion molding, injection molding, and solution casting can be utilized.

The sheet of the present invention is useful as a sheet for forming a shoe sole (a molded composite article as a shoe sole). That is, the sheet of the present invention is interposed between a crosslinked rubber layer as a stud (member) and a thermoplastic elastomer layer as a sole (member) and can preferably be used as a sheet for directly laminating these layers [or a sheet for forming a shoe sole (a molded composite article as a shoe sole) by directly forming a crosslinked rubber layer as a stud (member) at a first side of the sheet and directly forming a thermoplastic elastomer layer as a sole (member) at a second side thereof].

Incidentally, when a crosslinked rubber layer as a stud is tried to directly adhere to a thermoplastic elastomer layer as a sole, it is necessary to treat the surface of the crosslinked rubber layer as described above, and it is difficult to prevent the deformation of the thermoplastic elastomer layer. Moreover, when a high heat-resistant or high stiff material is used for a sole in order to prevent the deformation, the resulting sole deteriorates in flexibility, which is a performance requirement for a sole (shoe sole). Further, according to the above-mentioned Patent Document 3, a shoe sole having a three-layer structure, composed of an outsole design part made of a synthetic rubber, a thermoplastic elastomer sheet integrally joined to the design part, and a thermoplastic elastomer as a shoe sole body, has a certain degree of improved production efficiency. However, in order to inhibit or prevent the deformation of the thermoplastic elastomer sheet, it is necessary to open a metal mold in an initial stage of crosslinking of the rubber. In addition, imperfect adhesion between the outsole design part made of a synthetic rubber to the thermoplastic elastomer sheet sometimes occurs.

In contrast, since the sheet of the present invention comprises a specific component and has a relatively large stiffness (or rigidity), the sheet can firmly adhere to a crosslinked rubber layer without deformation of the layer even if the crosslinked rubber layer is not surface-treated. Furthermore, interposition of the sheet of the present invention between a crosslinked rubber layer and a thermoplastic elastomer layer allows firm adhesion between the sheet and a sole without deforming the sole comprising a thermoplastic elastomer and does not deteriorate the flexibility as a sole (or a shoe sole).

Accordingly, the sheet of the present invention allows the stud and the sole to be firmly joined at a high workability without a solvent or a chemical, in addition with no need to open the mold during crosslinking the rubber and achieves a shoe sole satisfying a performance requirement of a sole.

Hereinafter, a shoe sole (a molded composite article as a shoe sole) the sheet of the present invention will be explained in detail.

[Shoe Sole (Molded Composite Article as Shoe Sole)]

The shoe sole (the molded composite article as a shoe sole) of the present invention comprises the sheet, a crosslinked rubber layer (as a stud) directly formed (directly joined or laminated) on a first side of the sheet, and a thermoplastic elastomer layer (as a sole) directly formed (directly joined or laminated) on a second side of the sheet, as described above.

(Crosslinked Rubber Layer)

The crosslinked rubber layer is a layer of a crosslinked rubber. The layer is formed by crosslinking an uncrosslinked rubber (composition) (that is, the layer is a layer in which an uncrosslinked rubber (composition) is crosslinked).

The rubber (or the uncrosslinked rubber) is not particularly limited to a specific one, and may include a diene-series rubber, an olefinic rubber, an acrylic rubber, a fluorine-containing rubber (or a fluororubber), a silicone rubber, an epichlorohydrin rubber, a chlorosulfonated polyethylene, a propylene oxide rubber, an ethylene-vinyl acetate copolymer (EAM), a polynorbornene rubber, a modified rubber thereof (e.g., an acid-modified rubber), and others. These rubbers may be used alone or in combination.

As the diene-series rubber, for example, there may be mentioned a natural rubber (NR); a polymer of a diene-series monomer, such as an isoprene rubber (IR), an isobutylene-isoprene rubber (butyl rubber) (IIR), a butadiene rubber (BR), or a chloroprene rubber (CR); an acrylonitrile-diene copolymerized rubber such as an acrylonitrile-butadiene rubber (nitrile rubber) (NBR), a nitrile-chloroprene rubber (NCR), or a nitrile-isoprene rubber (NIR); a styrene-diene copolymerized rubber such as a styrene-butadiene rubber (SBR, for example, a random copolymer of styrene and butadiene, a SB-block copolymer comprising a styrene block and a butadiene block), a styrene-chloroprene rubber (SCR), or a styrene-isoprene rubber (SIR); and others. The diene-series rubber also includes a hydrogenated rubber, for example, a hydrogenated nitrile rubber (HNBR) or the like.

The olefinic rubber may include, for example, an ethylene-propylene rubber (EPM), an ethylene-propylene-diene rubber (e.g., EPDM), a polyoctenylene rubber, and others.

The acrylic rubber may include a rubber comprising an alkyl acrylate as a main component, such as a copolymer of an alkyl acrylate and a chlorine-containing crosslinkable monomer (ACM), a copolymer of an alkyl acrylate and acrylonitrile (ANM), a copolymer of an alkyl acrylate and a carboxyl group- and/or epoxy group-containing monomer, and an ethylene-acrylic rubber.

As the fluorine-containing rubber, there may be exemplified a rubber obtained from a fluorine-containing monomer, for example, a copolymer of vinylidene fluoride and perfluoropropene, and if necessary, tetrafluoroethylene (FKM); a copolymer of tetrafluoroethylene and propylene; a copolymer of tetrafluoroethylene and perfluoromethyl vinyl ether (FFKM).

The silicone rubber may include, for example, a methylsilicone rubber (MQ), a vinylsilicone rubber (VMQ), a phenylsilicone rubber (PMQ), a phenylvinylsilicone rubber (PVMQ), and a fluorosilicone rubber (FVMQ).

The modified rubber may include an acid-modified rubber of each of the above-mentioned rubbers, for example, a rubber having a carboxyl group or an acid anhydride group, such as a carboxylated styrene-butadiene rubber (X-SBR), an acid-modified nitrile rubber (carboxylated nitrile rubber, X-NBR), a carboxylated ethylene propylene rubber (X-EPM).

The crosslinked rubber layer may usually be formed from a composition containing an uncrosslinked rubber (or an unvulcanized rubber) (an uncrosslinked rubber composition or an unvulcanized rubber composition). The uncrosslinked rubber composition may comprise at least an uncrosslinked rubber and a crosslinking agent.

The crosslinking agent (vulcanizing agent) may include, for example, a radical-generating agent (e.g., an organic peroxide, an azo compound, and a sulfur-containing organic compound), a sulfur-series vulcanizing agent (e.g., a sulfur such as a powdered sulfur, a precipitated sulfur, a colloidal sulfur, an insoluble sulfur, or a highly dispersant sulfur; a sulfur chloride such as sulfur monochloride or sulfur dichloride; a surface-treated sulfur; an alkylphenol disulfide; and morpholine.disulfide), an oxime-series crosslinking agent (e.g., p-quinone dioxime and p,p'-dibenzoylquinone dioxime), a resin-series crosslinking agent (e.g., an alkylphenol-.formaldehyde resin, a sulfureted-p-tertiary-butylphenol resin, and a hexamethoxymethyl.melamine resin), a fatty acid salt (e.g., potassium laurate and sodium cocoate), and a metal salt (e.g., zinc oxide and zinc peroxide). These crosslinking agents may be used alone or in combination.

As the organic peroxide (or peroxide), there may for example be a hydroperoxide [for example, an alkyl hydroperoxide (e.g., t-butyl hydroperoxide) and an alkane dihydroperoxide (e.g., cumene hydroperoxide)], a dialkyl peroxide (e.g., a di-$C_{1-10}$alkyl peroxide such as di-t-butyl peroxide; a diaralkyl peroxide such as dicumyl peroxide; and an alkyl-aralkyl peroxide such as t-butyl-cumyl peroxide), a diacyl peroxide [for example, an alkanoyl peroxide such as diacetyl peroxide or lauroyl peroxide (e.g., a di-$C_{1-18}$alkanoyl peroxide); and a diaroyl peroxide such as benzoyl peroxide, 4-chlorobenzoyl peroxide, 2,4-dichlorobenzoyl peroxide, benzoyltoluoyl peroxide, or toluoyl peroxide (e.g., a di-$C_{7-12}$aroyl peroxide)], a di(alkylperoxy)alkane [for example, a di($C_{1-10}$alkylperoxy)$C_{1-10}$alkane such as 2,2-di(t-butylperoxy)butane or 2,5-dimethyl-2,5-di(t-butylperoxy)hexane], a di(alkylperoxy)cycloalkane [for example, a di($C_{1-10}$alkylperoxy)$C_{5-10}$cycloalkane such as 1,1-bis(t-butylperoxy)cyclohexane or 1,1-bis(t-butylperoxy)-3,3,5-trimethylcyclohexane], a di(alkylperoxyalkyl)arene [for example, a di($C_{1-10}$alkylperoxy$C_{1-4}$alkyl)$C_{6-10}$arene such as 1,3-bis(t-butylperoxyisopropyl)benzene], a di(alkylperoxy)alkyne [for example, 2,5-dimethyl-2,5-di(t-butylperoxy)hexyne-3], a di(acylperoxy)alkane (for example, 2,5-dimethyl-2,5-dibenzoylperoxyhexane), an ester of a peracid [for example, an alkyl ester of a peracid (e.g., an alkyl ester of a peralkanoic acid, such as t-butyl peracetate, t-butyl peroxyoctoate, or t-butyl peroxydecanoate (e.g., a $C_{1-6}$alkyl ester of a $C_{1-18}$peralkanoic acid); and an alkyl ester of a perarenecarboxylic acid, such as t-butyl peroxybenzoate or di-t-butyl peroxy(iso)phthalate (e.g., a $C_{1-6}$alkyl ester)], a ketone peroxide, and a peroxycarbonate.

The azo compound may include, for example, an azonitrile compound [e.g., 2,2'-azobis(2,4-dimethylvaleronitrile), 2,2'-azobis(isobutyronitrile), 2,2'-azobis(2-methylbutyronitrile), and 2,2'-azobis(4-methoxy-2,4-dimethylvaleronitrile)], an azoamide compound {e.g., 2,2'-azobis{2-methyl-N-[1,1-bis(hydroxymethyl)-2-hydroxyethyl]propionamide}}, an azoamidine compound {e.g., 2,2'-azobis(2-amidinopropane) dihydrochloride and 2,2'-azobis[2-(2-imidazolin-2-yl)propane]dihydrochloride}, and an azoalkane compound [e.g., 2,2'-azobis(2,4,4-trimethylpentane) and 4,4'-azobis(4-cyanopentanoic acid)].

As the sulfur-containing organic compound, there may be mentioned a thiuram compound (e.g., tetramethylthiuram monosulfide (TMTM), tetramethylthiuram disulfide (TMTD), tetraethylthiuram disulfide (TETD), tetrabutylthiuram disulfide (TBTD), and dipentamethylenethiuram tetrasulfide (DPTT)), a dithiocarbamate compound (e.g., a salt of a di$C_{1-4}$alkyldithiocarbamic acid (such as dimethyldithiocarbamic acid or diethyldithiocarbamic acid) with sodium, potassium, iron, copper, zinc, selenium, or tellurium), a thiazole compound (e.g., 2-mercaptobenzothiazole and 2-(4'-morpholinodithio)benzothiazole, and others. The sulfur-containing organic compound (such as TMTD) may be used in combination with sulfur or may be used as a sulfur-free crosslinking agent without combination with sulfur.

Among these crosslinking agents, the radical-generating agent is preferred. In particular, from the viewpoint of the adhesion to the sheet member, the organic peroxide is preferred.

The ratio of the crosslinking agent relative to 100 parts by weight of the uncrosslinked rubber may for example be about 0.1 to 20 parts by weight, preferably about 0.3 to 15 parts by weight, more preferably about 0.5 to 10 parts by weight, and particularly about 1 to 8 parts by weight.

Moreover, the uncrosslinked rubber composition may contain a crosslinking auxiliary (or a vulcanization activator or a vulcanization auxiliary). The crosslinking auxiliary may be selected according to the species of the crosslinking agent, and others. For example, the crosslinking auxiliary may include a vinyl-series monomer (e.g., divinylbenzene), an allyl-series monomer (e.g., diallyl phthalate, triallyl phosphate, triallyl (iso)cyanurate, and triallyl trimellitate), a (meth)acrylic monomer, a maleimide-series compound, a metal salt of di(meth)acrylic acid (e.g., a zinc salt and a magnesium salt), an ammonia derivative, a carbon disulfide derivative, and others. These crosslinking auxiliaries may be used alone or in combination.

As the (meth)acrylic monomer, there may be mentioned, for example, a difunctional (meth)acrylate [e.g., a $C_{2-10}$alkylene glycol di(meth)acrylate such as ethylene glycol di(meth)acrylate, propylene glycol di(meth)acrylate, or 1,4-butanediol di(meth)acrylate; a poly$C_{2-4}$alkylene glycol di(meth)acrylate such as diethylene glycol di(meth)acrylate, polyethylene glycol di(meth)acrylate, dipropylene glycol di(meth)acrylate, or polytetramethylene glycol di(meth)acrylate, glycerin di(meth)acrylate, trimethylolpropane di(meth)acrylate, pentaerythritol di(meth)acrylate, and a di(meth)acrylate of a $C_{2-4}$alkylene oxide adduct of bisphenol A] and a trifunctional or polyfunctional (meth)acrylate [e.g., glycerin tri(meth)acrylate, trimethylolethane tri(meth)acrylate, trimethylolpropane tri(meth)acrylate, pentaerythritol tri(meth)acrylate, pentaerythritol tetra(meth)acrylate, and dipentaerythritol tetra(meth)acrylate].

The maleimide-series compound may include, for example, an aromatic bismaleimide (e.g., N,N'-1,3-phenylenedimaleimide, N,N'-1,4-phenylenedimaleimide, N,N'-3-methyl-1,4-phenylenedimaleimide, 4,4'-bis(N,N'-maleimide)diphenylmethane, 4,4'-bis(N,N'-maleimide)diphenylsulfone, and 4,4'-bis(N,N'-maleimide) diphenyl ether) and an aliphatic bismaleimide (e.g., N,N'-1,2-ethylenebismaleimide, N,N'-1,3-propylenebismaleimide, and N,N'-1,4-tetramethylenebismaleimide).

As the ammonia derivative, there may be mentioned an aldehyde-ammonia compound (e.g., hexamethylenetetramine, acetaldehyde-ammonia, and ethyl chloride-formaldehyde-ammonia reaction product), an aldehyde-amine compound (e.g., n-butylaldehyde-aniline reaction product and butylaldehyde-acetaldehyde-butylideneaniline reaction product), a guanidine compound (e.g., N,N-diphenylguanidine, diorthotolylguanidine, and orthotolylbiguanide), and others.

The carbon disulfide derivative may include a thiourea compound (e.g., thiocarboanilide, diorthotolylthiourea, ethylenethiourea, dimethylthiourea, and trimethylthiourea), a dithiocarbamate compound (e.g., a salt of a di$C_{1-4}$alkyldithiocarbamic acid (such as dimethyldithiocarbamic acid or diethyldithiocarbamic acid) with sodium, potassium, iron, copper, zinc, selenium, or tellurium), a thiazole compound [e.g., 2-mercaptobenzothiazole (MBT), a salt of 2-mercaptobenzothiazole (e.g., a salt of a metal such as zinc or sodium, and a salt of an amine such as cyclohexylamine), dibenzothiazyldisulfide, and 2-(4'-morpholinodithio)benzothiazole], a sulfenamide compound (e.g., N-cyclohexyl-2-benzothiazolesulfenamide, N-t-butyl-2-benzothiazolesulfenamide, N-oxyethylene-2-benzothiazolesulfenamide, N,N'-diisopropyl-2-benzothiazolesulfenamide, and N-cyclohexyl-1,2-benzothiazoylsulfenamide), a xanthate compound (e.g., a salt of an alkylxanthic acid (such as isopropylxanthic acid or butylxanthic acid) with sodium, zinc, or others), and others.

The preferred crosslinking auxiliary can be selected according to the species of the crosslinking agent. When the radical-generating agent (such as an organic peroxide) serves as the crosslinking agent, a vinyl-series monomer, an allyl-series monomer, a (meth)acrylic monomer, a maleimide-series compound, or the like is preferred.

The amount to be used of the crosslinking auxiliary (vulcanization activator) can be selected according to the species of the vulcanization activator to be used, and others. The amount of the crosslinking auxiliary may be an amount capable of promoting the adhesion of the polyamide resin and the rubber, and may for example be about 0.1 to 15 parts by weight, preferably about 0.2 to 10 parts by weight, and more preferably about 0.3 to 5 parts by weight relative to 100 parts by weight of the rubber (uncrosslinked rubber). Moreover, the ratio of the crosslinking auxiliary relative to 1 part by weight of the crosslinking agent may be about 0.01 to 10 parts by weight, preferably about 0.05 to 5 parts by weight, and more preferably about 0.1 to 4 parts by weight.

The uncrosslinked rubber composition may further contain various additives if necessary. The additives may include, for example, a filler [e.g., a particulate filler or reinforcer (e.g., a mica, a clay, a talc, a silica, calcium carbonate, magnesium carbonate, a carbon black, a white carbon, and a ferrite) and a fibrous filler or reinforcer (e.g., an organic fiber such as a rayon, a nylon, a vinylon, or an aramid, and an inorganic fiber such as a carbon fiber or a glass fiber)], a softener (e.g., a vegetable oil such as linoleic acid, oleic acid, castor oil, or palm oil; and a mineral oil such as a paraffin, a process oil, or an extender), a plasticizer (e.g., a phthalate, an ester of an aliphatic dicarboxylic acid, a sulfur-containing plasticizer, and a polyester-series polymeric plasticizer), a co-crosslinking agent (e.g., a metal oxide such as zinc oxide or titanium oxide), an anti-aging agent (e.g., an anti-heat aging agent, an antiozonant, an antioxidant, and an ultraviolet ray absorbing agent), a tackifier, a processing synergist, a lubricant (e.g., stearic acid, a metal salt of stearic acid, and a wax), a flame retardant, an antistatic agent, and a coloring agent. These additives may be used alone or in combination.

The crosslinked rubber layer may have a thickness of, for example, about 1 to 30 mm, preferably about 2 to 20 mm, and more preferably about 3 to 15 mm or may usually have a thickness of about 2 to 20 mm. The thickness of the crosslinked rubber layer may be selected according to applications of shoes. For example, the thickness of the crosslinked rubber layer may be about 2 to 3.5 mm for running shoes and the like or may be about 10 to 20 mm for football (or soccer) shoes and the like.

Moreover, the thickness ratio of the crosslinked rubber layer relative to the sheet as a ratio of the former/the latter may be about 100/1 to 1/1, preferably about 90/1 to 2/1, and more preferably about 80/1 to 3/1 or may usually be about 75/1 to 4/1 (e.g., about 70/1 to 5/1).

The Akron abrasion loss of the crosslinked rubber (layer) can be selected from the range of not more than 200 mm$^3$ (e.g., about 0 to 150 mm$^3$) from the perspective that the rubber forms the stud. For example, the Akron abrasion loss may for example be not more than 100 mm$^3$ (e.g., about 0.1 to 90 mm$^3$), preferably not more than 80 mm$^3$ (e.g., about 0.5 to 75 mm$^3$), and more preferably not more than 70 mm$^3$ (e.g., about 1 to 60 mm$^3$) or may usually be about 1 to 50 mm$^3$ (e.g., about 2 to 40 mm$^3$). The Akron abrasion loss can be determined, for example, as an abrasion volume per 1000 revolutions under a load of 27 N, a leaning angle of 10°, and a revolution rate of 75 rpm according to Akron abrasion method B.

The crosslinked rubber (layer) may have a Shore A hardness of, for example, about 30 to 80, preferably about 35 to 70, and more preferably about 40 to 60. The Shore A hardness can be measured in accordance with ASTM D2240 or the like.

The crosslinked rubber layer forms a stud (stud part) of a shoe sole (a molded composite article as a shoe sole). Thus, the shape (or form) of the crosslinked rubber layer can be selected according to a desired shape (or form) of the stud. The crosslinked rubber layer may be formed on the whole or part surface of one side of the sheet.

The crosslinked rubber layer is directly bonded (or joined) to a first side of the sheet through no adhesive layer or the like. The adhesion between the crosslinked rubber layer and the sheet is firm. For example, for the molded composite article as a shoe sole according to the present invention, the adhesion (or joining) between the crosslinked rubber layer and the sheet is so firm that failure (cohesive failure) is observed on at least part of the interface between the crosslinked rubber layer and the sheet in the case that the crosslinked rubber layer and the sheet are separated from each other after maintaining the molded composite article for 4 days under the conditions of a temperature of 23° C. and a humidity of 50%.

(Thermoplastic Elastomer Layer)

The thermoplastic elastomer layer comprises a thermoplastic elastomer. The thermoplastic elastomer is not particularly limited to a specific one. The thermoplastic elastomer may include, for example, a polyurethane elastomer (a thermoplastic polyurethane elastomer), a polyamide elastomer, a polyester elastomer, a polyolefin elastomer, a polystyrene elastomer, a fluorine-containing elastomer, and an ethylene-vinyl acetate copolymer. These thermoplastic elastomers may be used alone or in combination.

The polyurethane elastomer may usually be a polyurethane block copolymer having a polyurethane (block) as a hard segment (hard block) and a soft segment [or a soft block, e.g., a polyether block or a polyester block (such as an aliphatic polyester block)].

Representative examples of the polyurethane elastomer may include a polyester urethane elastomer, a polyester ether urethane elastomer, a polyether urethane elastomer, and a polycarbonate urethane elastomer, according to the species of the soft segment.

Among the polyurethane elastomers, a polyester urethane elastomer, a polyester ether urethane elastomer, a polyether urethane elastomer, or others is preferred.

For the polyurethane elastomer, the number-average molecular weight of the soft segment (e.g., a polyether block) can for example be selected from the range of about 100 to 10000. The number-average molecular weight of the soft segment may be preferably about 300 to 6000 (e.g., about 300 to 5000) and more preferably about 500 to 4000 (e.g., about 500 to 3000) or may usually be about 1000 to 4000.

Moreover, the polyamide elastomer may include the polyamide elastomer as exemplified in the section on the sheet described above, and others. The polyamide elastomer of the thermoplastic elastomer layer may satisfy the above-mentioned melting point or amino group concentration, and flexural modulus or does not need to satisfy the above-mentioned melting point or amino group concentration, and flexural modulus.

The preferred thermoplastic elastomer may include a polyurethane elastomer and a polyamide elastomer in terms of adhesion. In particular, a polyurethane elastomer is preferred. These polyurethane elastomer and/or polyamide elastomer may be used in combination with a further thermoplastic elastomer.

When the thermoplastic elastomer comprises the polyurethane elastomer and/or the polyamide elastomer, the proportion of the polyurethane elastomer and/or the polyamide elastomer in the total thermoplastic elastomer may for example be not less than 30% by weight (e.g., about 40 to 100% by weight), not less than 50% by weight (e.g., about 60 to 100% by weight), and more preferably not less than 70% by weight (e.g., about 80 to 100% by weight).

The flexural modulus of the thermoplastic elastomer in accordance with ISO178 can for example be selected from the range of less than 600 MPa (e.g., about 20 to 550 MPa). The flexural modulus of the thermoplastic elastomer in accordance with ISO178 may be preferably less than 500 MPa (e.g., about 30 to 480 MPa), more preferably not more than 450 MPa (e.g., about 50 to 420 MPa), particularly not more than 400 MPa (e.g., about 80 to 400 MPa) or may usually be about 100 to 500 MPa (e.g., about 120 to 450 MPa and preferably about 130 to 400 MPa).

Moreover, the thermoplastic elastomer may have a Shore D hardness of, for example, about 40 to 100, preferably about 45 to 90, more preferably about 50 to 80, and usually about 50 to 70. The Shore D hardness can be measured in accordance with ASTM D2240 or others.

The thermoplastic elastomer layer may contain a component other than the thermoplastic elastomer as far as such a component does not deteriorate an advantage of the present invention. The component other than the thermoplastic elastomer may include, for example, an additive such as a stabilizer (e.g., a heat stabilizer, an ultraviolet ray absorbing agent, and an antioxidant), a plasticizer, a lubricant, a filler, a coloring agent, a flame retardant, or an antistatic agent. These additives may be used alone or in combination.

The thermoplastic elastomer layer may have a thickness of, for example, about 1 to 30 mm, preferably about 2 to 20 mm, and more preferably about 3 to 15 mm.

Moreover, the thickness ratio of the thermoplastic elastomer layer relative to the sheet as a ratio of the former/the latter may for example be about 100/1 to 1/1, preferably about 80/1 to 1.5/1, and more preferably about 50/1 to 2/1 or may usually be about 30/1 to 2/1 (e.g., about 20/1 to 2.5/1).

Further, the thickness ratio of the thermoplastic elastomer layer relative to the crosslinked rubber layer as a ratio of the former/the latter may be about 10/1 to 0.01/1, preferably about 5/1 to 0.03/1, and more preferably about 4/1 to 0.05/1 or may usually be about 3/1 to 0.05/1 (e.g., about 2/1 to 0.07/1).

The thermoplastic elastomer layer forms a sole (sole member) of a shoe sole (a molded composite article as a shoe sole). Thus, the shape (or form) of the thermoplastic elastomer layer can be selected according to a desired shape (or form) of the sole.

The thermoplastic elastomer layer is directly bonded (or joined) to a second side of the sheet (that is, a side different from the first side on which the crosslinked rubber layer is formed) through no adhesive layer or the like. The adhesion between the thermoplastic elastomer layer and the sheet is firm. For example, for the molded composite article as a shoe sole according to the present invention, the adhesion (or joining) between the thermoplastic elastomer layer and the sheet is so firm that failure (cohesive failure) is observed on at least part of the interface between the thermoplastic elastomer layer and the sheet in the case that the thermoplastic elastomer layer and the sheet are separated from each other after maintaining the molded composite article for 4 days under the conditions of a temperature of 23° C. and a humidity of 50%.

(Process for Producing Shoe Sole (Molded Composite Article as Shoe Sole))

The shoe sole (the molded composite article as a shoe sole) can be produced by directly forming the crosslinked rubber layer at the first side of the sheet and directly forming the thermoplastic elastomer layer at the second side of the sheet. The order of formation of the crosslinked rubber layer and the thermoplastic elastomer layer is not particularly limited to a specific one. In many cases, usually, after the crosslinked rubber layer is formed on the first side of the sheet, the thermoplastic elastomer layer is formed on the second side of the sheet. That is, according to the present invention, usually, after a composite composed of the sheet and the crosslinked rubber layer formed on the first side of the sheet (a sheet/crosslinked rubber layer composite) is obtained, the thermoplastic elastomer layer is formed on the second side of the sheet of the composite.

The sheet/crosslinked rubber layer composite (the integrally molded product composed of the sheet and the crosslinked rubber) can be obtained by bringing the sheet into contact with the uncrosslinked rubber (or uncrosslinked rubber composition) and crosslinking the rubber. In the contact and crosslinking, particularly, the crosslinking may be carried out without melting the sheet (or the resin component for the sheet). The crosslinking the sheet without melting (or substantially without melting) can efficiently prevent the composite (or the sheet) from deforming. According to the present invention, since the sheet comprising the above-mentioned specific resin component is used, not only a crosslinking reaction of the uncrosslinked rubber with the crosslinking agent occurs but also a reaction of the polyamide resin contained in the sheet with the crosslinking agent (further the crosslinking auxiliary) contained in the uncrosslinked rubber composition or a reaction of the polyamide resin with the uncrosslinked rubber probably occurs in the interface between the sheet and the uncrosslinked rubber (the composition) with the contact and the crosslinking. Due to these reactions, the composite in which the sheet firmly adheres to the crosslinked rubber layer can be obtained without using (or depending on) the melting of the sheet.

The process for obtaining the composite by bringing the sheet into contact with the uncrosslinked rubber (composition) is not particularly limited to a specific one. As the process, a general-purpose molding process such as extrusion molding, injection molding, press molding, or transfer molding can be used. In particular, according to the present invention, the crosslinked rubber layer may be formed by bringing a molten uncrosslinked rubber composition into contact with the first side of the sheet disposed inside a metal mold (or pouring a molten uncrosslinked rubber composition over the first side of the sheet disposed inside a metal mold) and crosslinking the uncrosslinked rubber composition. For example, the sheet and the crosslinked rubber layer can be bonded together by accommodating the sheet in a mold (or cavity) corresponding to a shape of a composite, injecting or extruding the uncrosslinked rubber composition to the sheet, and crosslinking the unvulcanized rubber composition. The sheet may be brought into contact with the uncrosslinked rubber composition under an applied pressure. For the applied pressure, thermal press molding, injection molding, or others may be utilized. The pressure molding may be carried out under a reduced pressure.

Since such a process allows the crosslinked rubber layer to be formed without requiring opening (removal) of the metal mold as described in Patent Document 3, the working efficiency can be significantly improved. That is, according to the above-mentioned Patent Document 3, it is necessary to open the metal mold in an initial stage of the rubber crosslinking in order to inhibit or prevent the deformation of the outsole member (stud). In contrast, according to the present invention, use of the sheet comprising the specific resin component achieves the crosslinked rubber stud firmly bonded to the sheet without deformation even if the crosslinking is completed as it is without requiring opening of the metal mold.

The crosslinking may be carried out under heating. The crosslinking temperature (or the contact temperature of the uncrosslinked rubber composition and the sheet) can for example be selected from the range of about 80 to 230° C., preferably about 100 to 210° C., and more preferably about 150 to 190° C. In particular, when the crosslinking temperature is low (for example, lower than 140° C.), it may take a long time to crosslink the rubber, or the adhesion (or bonding) of the uncrosslinked rubber composition and the sheet may be insufficient. Accordingly, also in terms of working efficiency, the crosslinking temperature may be not lower than 140° C. (e.g., about 145 to 200° C.), preferably not lower than 150° C. (e.g., about 150 to 190° C.), and more preferably about 155 to 185° C. (e.g., about 160 to 180° C.) Incidentally, as described above, from the viewpoint of deformation, it is preferable that the crosslinking temperature be lower than the melting point of the polyamide resin for the sheet. For example, when the sheet contains a polyamide resin having a melting point of not lower than 165° C. (e.g., in a proportion of not less than 30% by weight in the total polyamide resin), the crosslinking temperature may be lower than the melting point of this polyamide resin [for example, a temperature at least 3° C. (e.g., about 3 to 100° C.) lower than the melting point, preferably a temperature at least 5° C. (e.g., about 5 to 50° C.) lower than the melting point, and more preferably a temperature at least 10° C. (e.g., about 10 to 30° C.) lower than the melting point]. In particular, when the integral molding uses a large metal mold, the temperature distribution of the metal mold is not uniform. Thus it is preferable that the melting point of the polyamide resin be fully higher than the molding temperature as described above.

According to the present invention, as described above, the sheet comprises a polyamide resin having a specific flexural modulus or a relatively high melting point. Thus even if the crosslinking is carried out at such a temperature, the sheet and the crosslinked rubber layer can firmly be joined together without deformation of the sheet or others.

Incidentally, as described above, the crosslinking is preferably carried out without melting the sheet (or the polyamide resin for the sheet).

As stated above, the sheet/crosslinked rubber layer composite is obtainable.

The composite (or the molded composite article as a shoe sole) in which the sheet (or the sheet/crosslinked rubber layer composite) is directly bonded to the thermoplastic elastomer layer formed at the second side of the sheet can for example be obtained by forming the thermoplastic elastomer layer on the second side of the sheet (or the sheet/crosslinked rubber layer composite). Representatively, the composite can be produced by bringing the sheet into contact with the thermoplastic elastomer layer under heating.

The process for forming the thermoplastic elastomer layer is not particularly limited to a specific one. As the process, a general-purpose molding process such as extrusion molding, injection molding, compression molding, transfer molding, laser welding, or high-frequency welding can be used. In particular, according to the present invention, the thermoplastic elastomer layer may be formed by bringing a molten thermoplastic elastomer (or a composition thereof) into contact with the second side of the sheet (or pouring a molten thermoplastic elastomer over the second side of the sheet).

The contact temperature (or the melting temperature or heat-fusing temperature of the thermoplastic elastomer) may for example be about 120 to 280° C., preferably about 150 to 260° C., and more preferably about 180 to 250° C. In particular, when the thermoplastic elastomer is a polyamide elastomer, the contact temperature may be about 180 to 270° C. (e.g., about 200 to 250° C.); when the thermoplastic elastomer is a polyurethane elastomer, the contact temperature may be about 180 to 240° C. (e.g., about 200 to 220° C.). The contact temperature may be an internal temperature of a kneader (for example, a cylinder temperature of an injection molding machine).

Incidentally, by the contact of the sheet with the thermoplastic elastomer layer under heating, the sheet and the thermoplastic elastomer layer are firmly bonded together probably because direct joining due to the affinity (compatibility) of the polyamide resin for the sheet to the thermoplastic elastomer or direct joining due to effects of amino groups derived from the polyamide resin is achieved in the interface between the sheet and the thermoplastic elastomer layer. In particular, the direct joining due to the compatibility seems to be exhibited more advantageously when the thermoplastic elastomer contains a polyamide elastomer. Moreover, the effect of the direct joining due to amino groups seems to be exhibited advantageously when the thermoplastic elastomer contains a polyurethane elastomer.

EXAMPLES

The following examples are intended to describe this invention in further detail and should by no means be interpreted as defining the scope of the invention.

The components used are shown below.

[Sheet]

Polyamide resin (a): an alicyclic polyamide (manufactured by Daicel-Evonik Ltd., "CX7323", amino group concentration of 23 mmol/kg, melting point of 247° C., and flexural modulus of 1700 MPa)

Polyamide resin (b): a polyamide 613 (amino group concentration of 57 mmol/kg, melting point of 207° C., and flexural modulus of 2500 MPa)

Polyamide resin (c): a polyamide elastomer (a block copolymer containing a polyamide 612 as a hard segment and a polyether as a soft segment; amino group concentration of 19 mmol/kg, melting point of 196° C., and flexural modulus of 340 MPa)

Polyamide resin (d): a polyamide 1012 (amino group concentration of 35 mmol/kg, melting point of 185° C., and flexural modulus of 1500 MPa)

Polyamide resin (e): a polyamide 12 (manufactured by Daicel-Evonik Ltd., "ZL9500", amino group concentration of 65 mmol/kg, melting point of 178° C., and flexural modulus of 1200 MPa)

Polyamide resin (f): a polyamide 12 (manufactured by Daicel-Evonik Ltd., "L7321", amino group concentration of 5 mmol/kg, melting point of 178° C., and flexural modulus of 1200 MPa)

Polyamide resin (g): a polyamide elastomer (a block copolymer containing a polyamide 12 as hard segment and a polyether as a soft segment; manufactured by Daicel-Evonik Ltd., "X4442", amino group concentration of 5 mmol/kg, melting point of 175° C., and flexural modulus of 490 MPa)

Polyamide resin (h): a polyamide elastomer (a block copolymer containing a polyamide 12 as a hard segment and a polyether as a soft segment; manufactured by Daicel- Evonik Ltd., "E62-S4", amino group concentration of 5 mmol/kg, melting point of 172° C., and flexural modulus of 340 MPa)

Polyamide resin (i): a polyamide elastomer (a block copolymer containing a polyamide 12 as a hard segment and a polyether as a soft segment; manufactured by Daicel-Evonik Ltd., "E62-K1", amino group concentration of 17 mmol/kg, melting point of 164° C., and flexural modulus of 240 MPa)

Polyamide resin (j): a polyamide elastomer (a block copolymer containing a polyamide 12 as a hard segment and a polyether as a soft segment; manufactured by Daicel-Evonik Ltd., "E55-S4", amino group concentration of 5 mmol/kg, melting point of 164° C., and flexural modulus of 210 MPa)

Polyamide resin (k): a polyamide elastomer (a block copolymer containing a polyamide 12 as a hard segment and a polyether as a soft segment; manufactured by Daicel-Evonik Ltd., "ZE0900", amino group concentration of 42 mmol/kg, melting point of 164° C., and flexural modulus of 230 MPa)

Polyamide resin (1): a polyamide elastomer (a block copolymer containing a polyamide 12 as a hard segment and a polyether as a soft segment; manufactured by Daicel-Evonik Ltd., "E55-K1", amino group concentration of 17 mmol/kg, melting point of 160° C., and flexural modulus of 170 MPa)

Polyamide resin (m): a polyamide elastomer (a block copolymer containing polyamide 12 as a hard segment and a polyether as a soft segment; manufactured by Daicel-Evonik Ltd., "E30-S4", amino group concentration of 30 mmol/kg, melting point of 152° C., and flexural modulus of 45 MPa)

Polyamide resin (n): a polyamide elastomer (a block copolymer containing polyamide 12 as a hard segment and a polyether as a soft segment; manufactured by Daicel-Evonik Ltd., "E58-S4", amino group concentration of 38 mmol/kg, melting point of 144° C., and flexural modulus of 190 MPa)

Polyamide resin (o): a polyamide elastomer (a block copolymer containing a polyamide 12 as a hard segment and a polyether as a soft segment; manufactured by Arkema K.K., "PEBAX6333", amino group concentration of 9 mmol/kg, melting point of 169° C., and flexural modulus of 290 MPa)

Polyamide resin (p): a polyamide elastomer (a block copolymer containing a polyamide 12 as a hard segment and a polyether as a soft segment; manufactured by Arkema K.K., "PEBAX5533", amino group concentration of 9 mmol/kg, melting point of 159° C., and flexural modulus of 160 MPa)

The following polyamide resins (or compositions) (1) to (26) were prepared from these polyamide resins, and a sheet (0.5 mm thick and 10 cm square) composed of each prepared polyamide resin (or composition) was produced.

Polyamide resin (1): the polyamide resin (a) alone (amino group concentration of 23 mmol/kg, flexural modulus of 1700 MPa, and melting point of 247° C.; the proportion of a polyamide resin having a melting point (247° C.) of not lower than 165° C.=100% by weight)

Polyamide resin (2): the polyamide resin (b) alone (amino group concentration of 57 mmol/kg, flexural modulus of 2500 MPa, and melting point of 207° C.; the proportion of a polyamide resin having a melting point (207° C.) of not lower than 165° C.=100% by weight)

Polyamide resin (3): the polyamide resin (c) alone (amino group concentration of 19 mmol/kg, flexural modulus of 340 MPa, and melting point of 196° C.; the proportion of a polyamide resin having a melting point (196° C.) of not lower than 165° C.=100% by weight)

Polyamide resin (4): the polyamide resin (d) alone (amino group concentration of 35 mmol/kg, flexural modulus of 1500 MPa, and melting point of 185° C.; the proportion of a polyamide resin having a melting point (185° C.) of not lower than 165° C.=100% by weight)

Polyamide resin (5): the polyamide resin (e) alone (amino group concentration of 65 mmol/kg, flexural modulus of 1200 MPa, and melting point of 178° C.; the proportion of a polyamide resin having a melting point (178° C.) of not lower than 165° C.=100% by weight)

Polyamide resin (6): a molten mixture containing 30 parts by weight of the polyamide resin (d) and 70 parts by weight of the polyamide resin (e) (as a whole, amino group concentration of 56 mmol/kg and flexural modulus of 1250 MPa; the proportion of a polyamide resin having a melting point of not lower than 165° C.=100% by weight)

Polyamide resin (7): a molten mixture containing 50 parts by weight of the polyamide resin (e) and 50 parts by weight of the polyamide resin (k) (as a whole, amino group concentration of 53.5 mmol/kg and flexural modulus of 600 MPa; the proportion of a polyamide resin having a melting point of not lower than 165° C.=50% by weight)

Polyamide resin (8): a molten mixture containing 70 parts by weight of the polyamide resin (e) and 30 parts by weight of the polyamide resin (k) (as a whole, amino group concentration of 58.1 mmol/kg and flexural modulus of 870 MPa; the proportion of a polyamide resin having a melting point of not lower than 165° C.=70% by weight)

Polyamide resin (9): a molten mixture containing 70 parts by weight of the polyamide resin (e) and 30 parts by weight of the polyamide resin (j) (as a whole, amino group concentration of 47 mmol/kg and flexural modulus of 850 MPa; the proportion of a polyamide resin having a melting point of not lower than 165° C.=70% by weight)

Polyamide resin (10): a molten mixture containing 60 parts by weight of the polyamide resin (e) and 40 parts by weight of the polyamide resin (h) (as a whole, amino group concentration of 41 mmol/kg and flexural modulus of 750 MPa; the proportion of a polyamide resin having a melting point of not lower than 165° C.=100% by weight)

Polyamide resin (11): a molten mixture containing 10 parts by weight of the polyamide resin (d), 40 parts by weight of the polyamide resin (e), and 50 parts by weight of the polyamide resin (j) (as a whole, amino group concentration of 30.4 mmol/kg and flexural modulus of 730 MPa; the proportion of a polyamide resin having a melting point of not lower than 165° C.=50% by weight)

Polyamide resin (12): a molten mixture containing 50 parts by weight of the polyamide resin (c) and 50 parts by weight of the polyamide resin (f) (as a whole, amino group concentration of 12 mmol/kg and flexural modulus of 1400 MPa; the proportion of a polyamide resin having a melting point of not lower than 165° C.=100% by weight)

Polyamide resin (13): a molten mixture containing 50 parts by weight of the polyamide resin (a) and 50 parts by weight of the polyamide resin (f) (as a whole, amino group concentration of 14 mmol/kg and flexural modulus of 1500 MPa; the proportion of a polyamide resin having a melting point of not lower than 165° C.=100% by weight)

Polyamide resin (14): a molten mixture containing 50 parts by weight of the polyamide resin (e), 35 parts by weight of the polyamide resin (p), and 15 parts by weight of a glass fiber (as a whole resin component, amino group concentration of 42 mmol/kg, flexural modulus of 800 MPa, and melting point of 247° C., the proportion of a polyamide resin having a melting point of not lower than 165° C.=100% by weight; as a whole composition, amino group concentration of 37 mmol/kg and flexural modulus of 2100 MPa)

Polyamide resin (15): the polyamide resin (f) alone (amino group concentration of 5 mmol/kg, flexural modulus of 1200 MPa and melting point of 178° C.; the proportion of a polyamide resin having a melting point (178° C.) of not lower than 165° C.=100% by weight)

Polyamide resin (16): the polyamide resin (g) alone (amino group concentration of 5 mmol/kg, flexural modulus of 490 MPa, and melting point of 175° C.; the proportion of a polyamide resin having a melting point (175° C.) of not lower than 165° C.=100% by weight)

Polyamide resin (17): the polyamide resin (h) alone (amino group concentration of 5 mmol/kg, flexural modulus of 340 MPa, and melting point of 172° C.; the proportion of a polyamide resin having a melting point (172° C.) of not lower than 165° C.=100% by weight)

Polyamide resin (18): the polyamide resin (i) alone (amino group concentration of 17 mmol/kg, flexural modulus of 240 MPa, and melting point of 164° C.; the proportion of a polyamide resin having a melting point of not lower than 165° C.=0% by weight)

Polyamide resin (19): the polyamide resin (j) alone (amino group concentration of 5 mmol/kg, flexural modulus of 210 MPa, and melting point of 164° C.; the proportion of a polyamide resin having a melting point of not lower than 165° C.=0% by weight)

Polyamide resin (20): the polyamide resin (k) alone (amino group concentration of 42 mmol/kg, flexural modulus of 230 MPa, and melting point of 164° C.; the proportion of a polyamide resin having a melting point of lower than 165° C.=0% by weight)

Polyamide resin (21): the polyamide resin (1) alone (amino group concentration of 17 mmol/kg, flexural modulus of 170 MPa, and melting point of 160° C.; the proportion of a polyamide resin having a melting point of not lower than 165° C.=0% by weight)

Polyamide resin (22): the polyamide resin (m) alone (amino group concentration of 30 mmol/kg, flexural modulus of 45 MPa, and melting point of 152° C.; the proportion of a polyamide resin having a melting point of not lower than 165° C.=0% by weight)

Polyamide resin (23): the polyamide resin (n) alone (amino group concentration of 38 mmol/kg, flexural modulus of 190 MPa, and melting point of 144° C.; the proportion of a polyamide resin having a melting point of not lower than 165° C.=0% by weight)

Polyamide resin (24): the polyamide resin (O) alone (amino group concentration of 9 mmol/kg, flexural modulus of 290 MPa, and melting point of 169° C.; the proportion of a polyamide resin having a melting point of not lower than 165° C.=100% by weight)

Polyamide resin (25): the polyamide resin (p) alone (amino group concentration of 9 mmol/kg, flexural modulus of 160 MPa, and melting point of 159° C.; the proportion of a polyamide resin having a melting point of not lower than 165° C.=0% by weight)

Polyamide resin (26): a molten mixture containing 40 parts by weight of the polyamide resin (f) and 60 parts by weight of the polyamide resin (p) (as a whole, amino group concentration of 7.4 mmol/kg, flexural modulus of 550 MPa, and melting point of 159° C., the proportion of a polyamide resin having a melting point of not lower than 165° C.=40% by weight)

The amino group concentration, melting point, and flexural modulus of the polyamide resin (or resin composition) were measured as follows.

(Amino Group Concentration)

About 0.5 g of a polyamide-series material to be used as a sample was weighed out and dissolved in 40 ml of a phenol/methanol mixture. After confirmation of dissolution, 10 ml of methanol was added to the solution. The resulting sample solution was titrated with a hydrochloric acid aqueous solution to measure an amino group concentration thereof. As an apparatus, a Hiranuma automatic titrator COM-200, manufactured by Hiranuma Sangyo Co., Ltd., was used.

(Melting Point)

According to thermal analysis (DSC), the sample was heated to 250° C. for melting at a heating rate of 10° C./min., then cooled to −30° C. at 10° C./min., and then further heated for melting at a heating rate of 10° C./min. The peak temperature of melting was regarded as a melting point of the sample.

(Flexural Modulus)

The flexural modulus was measured in accordance with ISO178.

[Uncrosslinked Rubber Composition]

Each of the following rubber compositions (uncrosslinked rubber compositions) containing components as described later was used to prepare an uncrosslinked rubber sheet (0.5 mm thick and 10 cm square).

(Rubber Composition 1)

50 parts by weight of a natural rubber, 50 parts by weight of a butadiene rubber (manufactured by The Dow Chemical Company, "Buna EM1500"), 5 parts by weight of a polyoctenylene (manufactured by Evonik GmbH, "Vestenamer 8012"), 25 parts by weight of a clay (manufactured by Hoffmann Mineral, "Silitin Z86"), 45 parts by weight of a carbon black (N335), 10 parts by weight of a plasticizer (manufactured by Bayer, "Vulcanol 88"), 1 part by weight of stearic acid, 2 parts by weight of a vulcanization activator (manufactured by Seiko Chemical Co., Ltd., "Hicross M", compound name: trimethylolpropane trimethacrylate), and 6 parts by weight of a crosslinking agent (manufactured by Kayaku Akzo Corporation, "Perkadox 14/40", compound name: 1,3-bis(t-butylperoxyisopropyl)benzene)

(Rubber Composition 2)

50 parts by weight of a styrene-butadiene rubber (manufactured by JSR Corporation, "JSR #1502"), 50 parts by weight of a butadiene rubber (manufactured by The Dow Chemical Company, "Buna EM1500"), 10 parts by weight of a polyoctenylene (manufactured by Evonik GmbH, "Vestenamer 8012"), 25 parts by weight of a clay (manufactured by Hoffmann Mineral, "Silitin Z86"), 45 parts by weight of a carbon black (N335), 10 parts by weight of a plasticizer (manufactured by Bayer, "Vulcanol 88"), 1 part by weight of stearic acid, 2 parts by weight of a vulcanization activator (manufactured by Seiko Chemical Co., Ltd., "Hicross M", compound name: trimethylolpropane trimethacrylate), and 6 parts by weight of a crosslinking agent (manufactured by Kayaku Akzo Corporation, "Perkadox 14/40", compound name: 1,3-bis(t-butylperoxyisopropyl)benzene)

(Rubber Composition 3)

97 parts by weight of an ethylene-propylene-diene rubber (manufactured by DSM, "DSM 509x100"), 3 parts by weight of a polyoctenylene (manufactured by Evonik GmbH, "Vestenamer 8012"), 0.3 parts by weight of a carbon black (N335), 25 parts by weight of a white carbon (manufactured by Nihon Mistron Co., Ltd., "Mistron vapour"), 1 part by weight of a plasticizer (PEG 4000), 3 parts by weight of zinc oxide, 0.5 parts by weight of stearic acid, 0.5 parts by weight of a vulcanization activator (manufactured by Seiko Chemical Co., Ltd., "Hicross M", compound name: trimethylolpropane trimethacrylate), and 2.5 parts by weight of a crosslinking agent (manufactured by KayakuAkzo Corporation, "Perkadox 14/40", compound name: 1,3-bis(t-butylperoxyisopropyl)benzene)

(Rubber Composition 4)

100 parts by weight of a carboxylated ethylene-propylene rubber ("Excelor VA 1803"), 60 parts by weight of a carbon black (N774), 40 parts by weight of a plasticizer (naphthenic oil), 5 parts by weight of zinc oxide, 2 parts by weight of an anti-aging agent (TMQ), 3 parts by weight of a vulcanization activator (triallyl cyanurate), and 7.5 parts by weight of a crosslinking agent (manufactured by Kayaku Akzo Corporation, "Perkadox 14/40", compound name: 1,3-bis(t-butylperoxyisopropyl)benzene)

(Rubber Composition 5)

50 parts by weight of a nitrile rubber (manufactured by JSR Corporation, "JSR N240S"), 50 parts by weight of a carboxylated nitrile rubber (manufactured by Zeon Corporation, "Nipol 1027")), 60 parts by weight of a silica ("Vulkasil C"), 10 parts by weight of a plasticizer (manufactured by Bayer, "Vulkanol 88"), 3 parts by weight of titanium oxide, 2 parts by weight of a color material ("Opasin blue 690"), 1 part by weight of stearic acid, 1.5 parts by weight of a vulcanization activator (triallyl isocyanurate), and 6 parts by weight of a crosslinking agent (manufactured by Kayaku Akzo Corporation, "Perkadox 14/40", compound name: 1,3-bis(t-butylperoxyisopropyl)benzene)

(Rubber Composition 6)

100 parts by weight of a hydrogenated nitrile rubber (manufactured by Zeon Corporation, "Zetpol 3110"), 50 parts by weight of a carbon black (manufactured by Asahi Carbon Co., Ltd., "ASAHI 60", N550), 10 parts by weight of a plasticizer (manufactured by Bayer, "Vulkanol 88"), 2 parts by weight of zinc oxide, 4 parts by weight of a vulcanization activator (manufactured by Du Pont Kabushiki Kaisha, "HVA-2", compound name: N,N'-m-phenylenedimaleimide), and 7 parts by weight of a crosslinking agent (manufactured by Kayaku Akzo Corporation, "Perkadox 14/40", compound name: 1,3-bis(t-butylperoxyisopropyl)benzene)

(Rubber Composition 7)

100 parts by weight of an acrylic rubber (manufactured by Du Pont Kabushiki Kaisha, "VAMAC-G"), 100 parts by weight of a carbon black (manufactured by Asahi Carbon Co., Ltd., "ASAHI 60", N550), 0.5 parts by weight of a plasticizer ("Armeen 18D"), 2 parts by weight of a plasticizer (manufactured by Toho Chemical Industry Co., Ltd., "Phosphanol RL 210"), 2 parts by weight of stearic acid, 2 parts by weight of an anti-aging agent (manufactured by Ouchi Shinko Chemical Industrial Co., Ltd., "Nocrac CD"), 4 parts by weight of a vulcanization activator (manufactured by kawaguchi Chemical Industry Co., Ltd., DPG, compound name: N,N-diphenylguanidine), and 1.25 parts by weight of a crosslinking agent (MDA)

(Rubber Composition 8)

100 parts by weight of a fluorine-containing rubber (manufactured by Daikin Industries, Ltd., "Dai-EL G902"), 10 parts by weight of a carbon black (N990), 3 parts by weight of a crosslinking agent (manufactured by Atochem Yoshitomi Ltd., "Luperox 101 XL45"), and 4 parts by weight of a crosslinking agent (manufactured by Du Pont Kabushiki Kaisha, "Diak No. 7", compound name: triallyl isocyanurate)

[Sole (Thermoplastic Elastomer)]

Polyurethane elastomer (TPU1): an ester-series polyurethane elastomer, "T470A",

Polyurethane elastomer (TPU2): an ester-series polyurethane elastomer, "Desmopan8785", Polyamide elastomer (PAE1): a polyamide elastomer, manufactured by Daicel-Evonik Ltd., "E62-S4", flexural modulus of 340 MPa, Polyamide elastomer (PAE2): a polyamide elastomer, manufactured by Arkema K.K., "PEBAX6333", flexural modulus of 290 MPa

[Preparation of Test Piece and Evaluation Thereof]

Each test piece of a molded composite article as a shoe sole was obtained from the above-mentioned materials as follows.

A sheet of aluminum foil (having a surface baking-treated with a silicone for anti-bonding) was placed on a metallic flat plate (40 cm square), the above-mentioned polyamide resin sheet (10 cm square, 0.5 mm thick) was placed on the aluminum foil. A metal mold (3 mm thick) for rubber shown in the photograph of FIG. 1 was placed on the polyamide resin sheet. The above-mentioned uncrosslinked rubber sheet (9 cm square, 2.5 mm thick) was placed on the metal mold, and a sheet of aluminum foil (having a surface baking-treated with a silicone for anti-bonding) and a metallic flat plate (40 cm square) were placed in this order on the uncrosslinked rubber sheet. Thereafter, the resulting laminate was set inside a heat press machine regulated to a predetermined crosslinking temperature (150° C., 160° C., or 170° C.) shown in the after-mentioned tables. After the laminate was allowed to stand for a predetermined time (20 minutes for the crosslinking temperature of 150° C., 10 minutes for the crosslinking temperature of 160° C., or 7 minutes for the crosslinking temperature of 170° C.) under a pressing condition of 400 N, the pressing condition was released to give a integrally molded member composed of a sheet member and a stud member. Then the resulting molded member was put in a metal mold for resin (the temperature of the metal mold: 40° C.), and a thermoplastic elastomer was over-molded at a thickness of 2 mm on the molded member by injection molding (cylinder temperature: 210° C. for TPU1 and TPU2 or 250° C. for PAE1 and PAE2) to give a test piece of a molded composite article as a shoe sole.

In addition, in the same manner as in the above-mentioned method except that the thickness of the polyamide resin sheet was 0.3 mm and 0.7 mm instead of 0.5 mm, test pieces were obtained.

The resulting test pieces (10 cm square, three types of thickness: 0.3 mm, 0.5 mm, and 0.7 mm) were evaluated for the adhesion and deformation on the basis of the following criteria.

(Adhesion)

Each resulting test piece was evaluated for the adhesion by allowing the test piece to stand for 4 days under the conditions of a temperature of 23° C. and a humidity of 50% and then separating the sheet and the stud or separating the sheet and the sole with a pair of long-nose pliers. The criteria for evaluation were as follows.

A: Very firm adhesion (these members are not separated at the interface therebetween, and the test piece is broken.)

B: Firm adhesion (these members are partly separated at the interface therebetween, and the test piece is partly broken.)

C: Adhesion (these members are separated at the interface therebetween.)

When the adhesion between the sheet and the stud was evaluated as "C", the adhesion between the sheet and the sole was evaluated using a molded composite article comprising only the sheet and the sole.

(Deformation)

The deformation was evaluated by visually observing an area 10 cm square from the end of each resulting test piece.
+: No deformation
±: Part deformation (the end or the adhering area is partly deformed.)
−: Large deformation (the deformed area is larger than the area that is not deformed.)

The results are shown in Tables. Incidentally, the number of the tables corresponds to the number of the polyamide resins used. For example, for Table 1, the polyamide resin (1) was used; for Table 10, the polyamide resin (10) was used. Moreover, in the tables, the temperature in the parenthesis of the column "stud" indicates a crosslinking temperature (° C.) of a rubber composition.

TABLE 1

| Examples | Sheet | Stud | Sole | Adhesion Stud/Sheet | Adhesion Sole/Sheet | Deformation |
|---|---|---|---|---|---|---|
| 1-1 | Polyamide | Rubber | TPU1 | B | A | + |
| 1-2 | resin (1) | compo- | TPU2 | B | A | + |
| 1-3 | amino group | sition 1 | PAE1 | B | B | + |
| 1-4 | concentration | (160° C.) | PAE2 | B | B | + |
| 1-5 | of 23 mmol/kg | Rubber | TPU1 | A | A | + |
| 1-6 | flexural | compo- | TPU2 | A | A | + |
| 1-7 | modulus of | sition 2 | PAE1 | A | B | + |
| 1-8 | 1700 Mpa | (160° C.) | PAE2 | A | B | + |
| 1-9 | 100% by weight | Rubber | TPU1 | A | A | + |
| 1-10 | of polyamide | compo- | TPU2 | A | A | + |
| 1-11 | resin having | sition 3 | PAE1 | A | B | + |
| 1-12 | melting point | (170° C.) | PAE2 | A | B | + |
| 1-13 | of not lower | Rubber | TPU1 | A | A | + |
| 1-14 | than 165° C. | compo- | TPU2 | A | A | + |
| 1-15 |  | sition 4 | PAE1 | A | B | + |
| 1-16 |  | (160° C.) | PAE2 | A | B | + |
| 1-17 |  | Rubber | TPU1 | B | A | + |
| 1-18 |  | compo- | TPU2 | B | A | + |
| 1-19 |  | sition 5 | PAE1 | B | B | + |
| 1-20 |  | (150° C.) | PAE2 | B | B | + |
| 1-21 |  | Rubber | TPU1 | A | A | + |
| 1-22 |  | compo- | TPU2 | A | A | + |
| 1-23 |  | sition 5 | PAE1 | A | B | + |
| 1-24 |  | (160° C.) | PAE2 | A | B | + |
| 1-25 |  | Rubber | TPU1 | A | A | + |
| 1-26 |  | compo- | TPU2 | A | A | + |
| 1-27 |  | sition 6 | PAE1 | A | B | + |
| 1-28 |  | (170° C.) | PAE2 | A | B | + |
| 1-29 |  | Rubber | TPU1 | A | A | + |
| 1-30 |  | compo- | TPU2 | A | A | + |
| 1-31 |  | sition 7 | PAE1 | A | B | + |
| 1-32 |  | (160° C.) | PAE2 | A | B | + |
| 1-33 |  | Rubber | TPU1 | A | A | + |
| 1-34 |  | compo- | TPU2 | A | A | + |
| 1-35 |  | sition 8 | PAE1 | A | B | + |
| 1-36 |  | (170° C.) | PAE2 | A | B | + |

TABLE 2

| Examples | Sheet | Stud | Sole | Adhesion Stud/Sheet | Adhesion Sole/Sheet | Deformation |
|---|---|---|---|---|---|---|
| 2-1 | polyamide | Rubber | TPU1 | B | B | + |
| 2-2 | resin (2) | compo- | TPU2 | B | B | + |
| 2-3 | amino group | sition 1 | PAE1 | B | B | + |
| 2-4 | concentration | (160° C.) | PAE2 | B | B | + |
| 2-5 | of 57 mmol/kg | Rubber | TPU1 | B | B | + |
| 2-6 | flexural | compo- | TPU2 | B | B | + |
| 2-7 | modulus of | sition 2 | PAE1 | B | B | + |
| 2-8 | 2500 Mpa | (160° C.) | PAE2 | B | B | + |
| 2-9 | 100% by weight | Rubber | TPU1 | B | B | + |
| 2-10 | of polyamide | compo- | TPU2 | B | B | + |
| 2-11 | resin having | sition 3 | PAE1 | B | B | + |
| 2-12 | melting point | (170° C.) | PAE2 | B | B | + |
| 2-13 | of not lower | Rubber | TPU1 | B | B | + |
| 2-14 | than 165° C. | compo- | TPU2 | B | B | + |
| 2-15 |  | sition 4 | PAE1 | B | B | + |
| 2-16 |  | (160° C.) | PAE2 | B | B | + |
| 2-17 |  | Rubber | TPU1 | B | B | + |
| 2-18 |  | compo- | TPU2 | B | B | + |
| 2-19 |  | sition 5 | PAE1 | B | B | + |
| 2-20 |  | (150° C.) | PAE2 | B | B | + |
| 2-21 |  | Rubber | TPU1 | A | B | + |
| 2-22 |  | compo- | TPU2 | A | B | + |
| 2-23 |  | sition 5 | PAE1 | A | B | + |
| 2-24 |  | (160° C.) | PAE2 | A | B | + |
| 2-25 |  | Rubber | TPU1 | A | B | + |
| 2-26 |  | compo- | TPU2 | A | B | + |
| 2-27 |  | sition 6 | PAE1 | A | B | + |
| 2-28 |  | (170° C.) | PAE2 | A | B | + |
| 2-29 |  | Rubber | TPU1 | A | B | + |
| 2-30 |  | compo- | TPU2 | A | B | + |
| 2-31 |  | sition 7 | PAE1 | A | B | + |
| 2-32 |  | (160° C.) | PAE2 | A | B | + |
| 2-33 |  | Rubber | TPU1 | A | B | + |
| 2-34 |  | compo- | TPU2 | A | B | + |
| 2-35 |  | sition 8 | PAE1 | A | B | + |
| 2-36 |  | (170° C.) | PAE2 | A | B | + |

TABLE 3

| Examples | Sheet | Stud | Sole | Adhesion Stud/Sheet | Adhesion Sole/Sheet | Deformation |
|---|---|---|---|---|---|---|
| 3-1 | Polyamide | Rubber | TPU1 | B | B | + |
| 3-2 | resin (3) | compo- | TPU2 | B | B | + |
| 3-3 | amino group | sition 1 | PAE1 | B | B | + |
| 3-4 | concentration | (160° C.) | PAE2 | B | B | + |
| 3-5 | of 19 mmol/kg | Rubber | TPU1 | A | B | + |
| 3-6 | flexural | compo- | TPU2 | A | B | + |
| 3-7 | modulus of | sition 2 | PAE1 | A | B | + |
| 3-8 | 340 Mpa | (160° C.) | PAE2 | A | B | + |
| 3-9 | 100% by weight | Rubber | TPU1 | A | B | ± |
| 3-10 | of polyamide | compo- | TPU2 | A | B | ± |
| 3-11 | resin having | sition 3 | PAE1 | A | B | ± |
| 3-12 | melting point | (170° C.) | PAE2 | A | B | ± |
| 3-13 | of not lower | Rubber | TPU1 | A | B | + |
| 3-14 | than 165° C. | compo- | TPU2 | A | B | + |
| 3-15 |  | sition 4 | PAE1 | A | B | + |
| 3-16 |  | (160° C.) | PAE2 | A | B | + |
| 3-17 |  | Rubber | TPU1 | A | B | + |
| 3-18 |  | compo- | TPU2 | A | B | + |
| 3-19 |  | sition 5 | PAE1 | A | B | + |
| 3-20 |  | (150° C.) | PAE2 | A | B | + |
| 3-21 |  | Rubber | TPU1 | A | B | + |
| 3-22 |  | compo- | TPU2 | A | B | + |
| 3-23 |  | sition 5 | PAE1 | A | B | + |
| 3-24 |  | (160° C.) | PAE2 | A | B | + |
| 3-25 |  | Rubber | TPU1 | A | B | ± |
| 3-26 |  | compo- | TPU2 | A | B | ± |
| 3-27 |  | sition 6 | PAE1 | A | B | ± |
| 3-28 |  | (170° C.) | PAE2 | A | B | ± |
| 3-29 |  | Rubber | TPU1 | A | B | + |
| 3-30 |  | compo- | TPU2 | A | B | + |
| 3-31 |  | sition 7 | PAE1 | A | B | + |
| 3-32 |  | (160° C.) | PAE2 | A | B | + |
| 3-33 |  | Rubber | TPU1 | B | B | ± |
| 3-34 |  | compo- | TPU2 | B | B | ± |

TABLE 3-continued

| Examples | Sheet | Stud | Sole | Adhesion Stud/Sheet | Adhesion Sole/Sheet | Deformation |
|---|---|---|---|---|---|---|
| 3-35 | | sition 8 | PAE1 | B | B | ± |
| 3-36 | | (170° C.) | PAE2 | B | B | ± |

TABLE 4

| Examples | Sheet | Stud | Sole | Adhesion Stud/Sheet | Adhesion Sole/Sheet | Deformation |
|---|---|---|---|---|---|---|
| 4-1 | Polyamide | Rubber | TPU1 | B | B | + |
| 4-2 | resin (4) | compo- | TPU2 | B | B | + |
| 4-3 | amino group | sition 1 | PAE1 | B | B | + |
| 4-4 | concentration | (160° C.) | PAE2 | B | B | + |
| 4-5 | of 35 mmol/kg | Rubber | TPU1 | A | B | + |
| 4-6 | flexural | compo- | TPU2 | A | B | + |
| 4-7 | modulus of | sition 2 | PAE1 | A | B | + |
| 4-8 | 1500 Mpa | (160° C.) | PAE2 | A | B | + |
| 4-9 | 100% by weight | Rubber | TPU1 | B | B | + |
| 4-10 | of polyamide | compo- | TPU2 | B | B | + |
| 4-11 | resin having | sition 3 | PAE1 | B | B | + |
| 4-12 | melting point | (170° C.) | PAE2 | B | B | + |
| 4-13 | of not lower | Rubber | TPU1 | B | B | + |
| 4-14 | than 165° C. | compo- | TPU2 | B | B | + |
| 4-15 | | sition 4 | PAE1 | B | B | + |
| 4-16 | | (160° C.) | PAE2 | B | B | + |
| 4-17 | | Rubber | TPU1 | A | B | + |
| 4-18 | | compo- | TPU2 | A | B | + |
| 4-19 | | sition 5 | PAE1 | A | B | + |
| 4-20 | | (150° C.) | PAE2 | A | B | + |
| 4-21 | | Rubber | TPU1 | A | B | + |
| 4-22 | | compo- | TPU2 | A | B | + |
| 4-23 | | sition 5 | PAE1 | A | B | + |
| 4-24 | | (160° C.) | PAE2 | A | B | + |
| 4-25 | | Rubber | TPU1 | A | B | + |
| 4-26 | | compo- | TPU2 | A | B | + |
| 4-27 | | sition 6 | PAE1 | A | B | + |
| 4-28 | | (170° C.) | PAE2 | A | B | + |
| 4-29 | | Rubber | TPU1 | A | B | + |
| 4-30 | | compo- | TPU2 | A | B | + |
| 4-31 | | sition 7 | PAE1 | A | B | + |
| 4-32 | | (160° C.) | PAE2 | A | B | + |
| 4-33 | | Rubber | TPU1 | A | B | + |
| 4-34 | | compo- | TPU2 | A | B | + |
| 4-35 | | sition 8 | PAE1 | A | B | + |
| 4-36 | | (170° C.) | PAE2 | A | B | + |

TABLE 5

| Examples | Sheet | Stud | Sole | Adhesion Stud/Sheet | Adhesion Sole/Sheet | Deformation |
|---|---|---|---|---|---|---|
| 5-1 | Polyamide | Rubber | TPU1 | A | A | + |
| 5-2 | resin (5) | compo- | TPU2 | A | A | + |
| 5-3 | amino group | sition 1 | PAE1 | A | A | + |
| 5-4 | concentration | (160° C.) | PAE2 | A | A | + |
| 5-5 | of 65 mmol/kg | Rubber | TPU1 | A | A | + |
| 5-6 | flexural | compo- | TPU2 | A | A | + |
| 5-7 | modulus of | sition 2 | PAE1 | A | A | + |
| 5-8 | 1200 Mpa | (160° C.) | PAE2 | A | A | + |
| 5-9 | 100% by weight | Rubber | TPU1 | A | A | ± |
| 5-10 | of polyamide | compo- | TPU2 | A | A | ± |
| 5-11 | resin having | sition 3 | PAE1 | A | A | ± |
| 5-12 | melting point | (170° C.) | PAE2 | A | A | ± |
| 5-13 | of not lower | Rubber | TPU1 | A | A | + |
| 5-14 | than 165° C. | compo- | TPU2 | A | A | + |
| 5-15 | | sition 4 | PAE1 | A | A | + |
| 5-16 | | (160° C.) | PAE2 | A | A | + |
| 5-17 | | Rubber | TPU1 | A | A | + |
| 5-18 | | compo- | TPU2 | A | A | + |
| 5-19 | | sition 5 | PAE1 | A | A | + |
| 5-20 | | (150° C.) | PAE2 | A | A | + |
| 5-21 | | Rubber | TPU1 | A | A | + |
| 5-22 | | compo- | TPU2 | A | A | + |
| 5-23 | | sition 5 | PAE1 | A | A | + |
| 5-24 | | (160° C.) | PAE2 | A | A | + |
| 5-25 | | Rubber | TPU1 | A | A | ± |
| 5-26 | | compo- | TPU2 | A | A | ± |
| 5-27 | | sition 6 | PAE1 | A | A | ± |
| 5-28 | | (170° C.) | PAE2 | A | A | ± |
| 5-29 | | Rubber | TPU1 | A | A | + |
| 5-30 | | compo- | TPU2 | A | A | + |
| 5-31 | | sition 7 | PAE1 | A | A | + |
| 5-32 | | (160° C.) | PAE2 | A | A | + |
| 5-33 | | Rubber | TPU1 | A | A | ± |
| 5-34 | | compo- | TPU2 | A | A | ± |
| 5-35 | | sition 8 | PAE1 | A | A | ± |
| 5-36 | | (170° C.) | PAE2 | A | A | ± |

TABLE 6

| Examples | Sheet | Stud | Sole | Adhesion Stud/Sheet | Adhesion Sole/Sheet | Deformation |
|---|---|---|---|---|---|---|
| 6-1 | Polyamide | Rubber | TPU1 | A | A | + |
| 6-2 | resin (6) | compo- | TPU2 | A | A | + |
| 6-3 | amino group | sition 1 | PAE1 | A | A | + |
| 6-4 | concentration | (160° C.) | PAE2 | A | A | + |
| 6-5 | of 56 mmol/kg | Rubber | TPU1 | A | A | + |
| 6-6 | flexural | compo- | TPU2 | A | A | + |
| 6-7 | modulus of | sition 2 | PAE1 | A | A | + |
| 6-8 | 1250 Mpa | (160° C.) | PAE2 | A | A | + |
| 6-9 | 100% by weight | Rubber | TPU1 | B | A | + |
| 6-10 | of polyamide | compo- | TPU2 | B | A | + |
| 6-11 | resin having | sition 3 | PAE1 | B | A | + |
| 6-12 | melting point | (170° C.) | PAE2 | B | A | + |
| 6-13 | of not lower | Rubber | TPU1 | A | A | + |
| 6-14 | than 165° C. | compo- | TPU2 | A | A | + |
| 6-15 | | sition 4 | PAE1 | A | A | + |
| 6-16 | | (160° C.) | PAE2 | A | A | + |
| 6-17 | | Rubber | TPU1 | A | A | + |
| 6-18 | | compo- | TPU2 | A | A | + |
| 6-19 | | sition 5 | PAE1 | A | A | + |
| 6-20 | | (150° C.) | PAE2 | A | A | + |
| 6-21 | | Rubber | TPU1 | A | A | + |
| 6-22 | | compo- | TPU2 | A | A | + |
| 6-23 | | sition 5 | PAE1 | A | A | + |
| 6-24 | | (160° C.) | PAE2 | A | A | + |
| 6-25 | | Rubber | TPU1 | A | A | + |
| 6-26 | | compo- | TPU2 | A | A | + |
| 6-27 | | sition 6 | PAE1 | A | A | + |
| 6-28 | | (170° C.) | PAE2 | A | A | + |
| 6-29 | | Rubber | TPU1 | A | A | + |
| 6-30 | | compo- | TPU2 | A | A | + |
| 6-31 | | sition 7 | PAE1 | A | A | + |
| 6-32 | | (160° C.) | PAE2 | A | A | + |
| 6-33 | | Rubber | TPU1 | A | A | + |
| 6-34 | | compo- | TPU2 | A | A | + |
| 6-35 | | sition 8 | PAE1 | A | A | + |
| 6-36 | | (170° C.) | PAE2 | A | A | + |

TABLE 7

| Examples | Sheet | Stud | Sole | Adhesion Stud/Sheet | Adhesion Sole/Sheet | Deformation |
|---|---|---|---|---|---|---|
| 7-1 | Polyamide resin (7) amino group concentration of 53.5 mmol/kg flexural modulus of 600 Mpa 50% by weight of polyamide resin having melting point of not lower than 165° C. | Rubber composition 1 (160° C.) | TPU1 | A | A | ± |
| 7-2 | | | TPU2 | A | A | ± |
| 7-3 | | | PAE1 | A | A | ± |
| 7-4 | | | PAE2 | A | A | ± |
| 7-5 | | Rubber composition 2 (160° C.) | TPU1 | A | A | ± |
| 7-6 | | | TPU2 | A | A | ± |
| 7-7 | | | PAE1 | A | A | ± |
| 7-8 | | | PAE2 | A | A | ± |
| 7-9 | | Rubber composition 3 (170° C.) | TPU1 | A | A | ± |
| 7-10 | | | TPU2 | A | A | ± |
| 7-11 | | | PAE1 | A | A | ± |
| 7-12 | | | PAE2 | A | A | ± |
| 7-13 | | Rubber composition 4 (160° C.) | TPU1 | A | A | ± |
| 7-14 | | | TPU2 | A | A | ± |
| 7-15 | | | PAE1 | A | A | ± |
| 7-16 | | | PAE2 | A | A | ± |
| 7-17 | | Rubber composition 5 (150° C.) | TPU1 | A | A | + |
| 7-18 | | | TPU2 | A | A | + |
| 7-19 | | | PAE1 | A | A | + |
| 7-20 | | | PAE2 | A | A | + |
| 7-21 | | Rubber composition 5 (160° C.) | TPU1 | A | A | ± |
| 7-22 | | | TPU2 | A | A | ± |
| 7-23 | | | PAE1 | A | A | ± |
| 7-24 | | | PAE2 | A | A | ± |
| 7-25 | | Rubber composition 6 (170° C.) | TPU1 | A | A | ± |
| 7-26 | | | TPU2 | A | A | ± |
| 7-27 | | | PAE1 | A | A | ± |
| 7-28 | | | PAE2 | A | A | ± |
| 7-29 | | Rubber composition 7 (160° C.) | TPU1 | A | A | ± |
| 7-30 | | | TPU2 | A | A | ± |
| 7-31 | | | PAE1 | A | A | ± |
| 7-32 | | | PAE2 | A | A | ± |
| 7-33 | | Rubber composition 8 (170° C.) | TPU1 | A | A | ± |
| 7-34 | | | TPU2 | A | A | ± |
| 7-35 | | | PAE1 | A | A | ± |
| 7-36 | | | PAE2 | A | A | ± |

TABLE 8

| Examples | Sheet | Stud | Sole | Adhesion Stud/Sheet | Adhesion Sole/Sheet | Deformation |
|---|---|---|---|---|---|---|
| 8-1 | Polyamide resin (8) amino group concentration of 58.1 mmol/kg flexural modulus of 870 Mpa 70% by weight of polyamide resin having melting point of not lower than 165° C. | Rubber composition 1 (160° C.) | TPU1 | A | A | + |
| 8-2 | | | TPU2 | A | A | + |
| 8-3 | | | PAE1 | A | A | + |
| 8-4 | | | PAE2 | A | A | + |
| 8-5 | | Rubber composition 2 (160° C.) | TPU1 | A | A | + |
| 8-6 | | | TPU2 | A | A | + |
| 8-7 | | | PAE1 | A | A | + |
| 8-8 | | | PAE2 | A | A | + |
| 8-9 | | Rubber composition 3 (170° C.) | TPU1 | A | A | ± |
| 8-10 | | | TPU2 | A | A | ± |
| 8-11 | | | PAE1 | A | A | ± |
| 8-12 | | | PAE2 | A | A | ± |
| 8-13 | | Rubber composition 4 (160° C.) | TPU1 | A | A | + |
| 8-14 | | | TPU2 | A | A | + |
| 8-15 | | | PAE1 | A | A | + |
| 8-16 | | | PAE2 | A | A | + |
| 8-17 | | Rubber composition 5 (150° C.) | TPU1 | A | A | + |
| 8-18 | | | TPU2 | A | A | + |
| 8-19 | | | PAE1 | A | A | + |
| 8-20 | | | PAE2 | A | A | + |
| 8-21 | | Rubber composition 5 (160° C.) | TPU1 | A | A | + |
| 8-22 | | | TPU2 | A | A | + |
| 8-23 | | | PAE1 | A | A | + |
| 8-24 | | | PAE2 | A | A | + |
| 8-25 | | Rubber composition 6 (170° C.) | TPU1 | A | A | ± |
| 8-26 | | | TPU2 | A | A | ± |
| 8-27 | | | PAE1 | A | A | ± |
| 8-28 | | | PAE2 | A | A | ± |
| 8-29 | | Rubber composition 7 (160° C.) | TPU1 | A | A | + |
| 8-30 | | | TPU2 | A | A | + |
| 8-31 | | | PAE1 | A | A | + |
| 8-32 | | | PAE2 | A | A | + |
| 8-33 | | Rubber composition 8 (170° C.) | TPU1 | A | A | ± |
| 8-34 | | | TPU2 | A | A | ± |
| 8-35 | | | PAE1 | A | A | ± |
| 8-36 | | | PAE2 | A | A | ± |

TABLE 9

| Examples | Sheet | Stud | Sole | Adhesion Stud/Sheet | Adhesion Sole/Sheet | Deformation |
|---|---|---|---|---|---|---|
| 9-1 | Polyamide resin (9) amino group concentration of 47 mmol/kg flexural modulus of 850 Mpa 70% by weight of polyamide resin having melting point of not lower than 165° C. | Rubber composition 1 (160° C.) | TPU1 | A | A | + |
| 9-2 | | | TPU2 | A | A | + |
| 9-3 | | | PAE1 | A | A | + |
| 9-4 | | | PAE2 | A | A | + |
| 9-5 | | Rubber composition 2 (160° C.) | TPU1 | A | A | + |
| 9-6 | | | TPU2 | A | A | + |
| 9-7 | | | PAE1 | A | A | + |
| 9-8 | | | PAE2 | A | A | + |
| 9-9 | | Rubber composition 3 (170° C.) | TPU1 | A | A | ± |
| 9-10 | | | TPU2 | A | A | ± |
| 9-11 | | | PAE1 | A | A | ± |
| 9-12 | | | PAE2 | A | A | ± |
| 9-13 | | Rubber composition 4 (160° C.) | TPU1 | A | A | + |
| 9-14 | | | TPU2 | A | A | + |
| 9-15 | | | PAE1 | A | A | + |
| 9-16 | | | PAE2 | A | A | + |
| 9-17 | | Rubber composition 5 (150° C.) | TPU1 | A | A | + |
| 9-18 | | | TPU2 | A | A | + |
| 9-19 | | | PAE1 | A | A | + |
| 9-20 | | | PAE2 | A | A | + |
| 9-21 | | Rubber composition 5 (160° C.) | TPU1 | A | A | + |
| 9-22 | | | TPU2 | A | A | + |
| 9-23 | | | PAE1 | A | A | + |
| 9-24 | | | PAE2 | A | A | + |
| 9-25 | | Rubber composition 6 (170° C.) | TPU1 | A | A | ± |
| 9-26 | | | TPU2 | A | A | ± |
| 9-27 | | | PAE1 | A | A | ± |
| 9-28 | | | PAE2 | A | A | ± |
| 9-29 | | Rubber composition 7 (160° C.) | TPU1 | A | A | + |
| 9-30 | | | TPU2 | A | A | + |
| 9-31 | | | PAE1 | A | A | + |
| 9-32 | | | PAE2 | A | A | + |
| 9-33 | | Rubber composition 8 (170° C.) | TPU1 | A | A | ± |
| 9-34 | | | TPU2 | A | A | ± |
| 9-35 | | | PAE1 | A | A | ± |
| 9-36 | | | PAE2 | A | A | ± |

TABLE 10

| Examples | Sheet | Stud | Sole | Adhesion Stud/Sheet | Adhesion Sole/Sheet | Deformation |
|---|---|---|---|---|---|---|
| 10-1 | Polyamide resin (10) amino group concentration of 41 mmol/kg flexural modulus of 750 Mpa 100% by weight of polyamide | Rubber composition 1 (160° C.) | TPU1 | B | B | ± |
| 10-2 | | | TPU2 | B | A | ± |
| 10-3 | | | PAE1 | B | A | ± |
| 10-4 | | | PAE2 | B | A | ± |
| 10-5 | | Rubber composition 2 (160° C.) | TPU1 | B | B | ± |
| 10-6 | | | TPU2 | B | A | ± |
| 10-7 | | | PAE1 | B | A | ± |
| 10-8 | | | PAE2 | B | A | ± |
| 10-9 | | Rubber composition | TPU1 | B | B | ± |
| 10-10 | | | TPU2 | B | A | ± |

TABLE 10-continued

| Examples | Sheet | Stud | Sole | Adhesion Stud/Sheet | Adhesion Sole/Sheet | Deformation |
|---|---|---|---|---|---|---|
| 10-11 | resin having | sition 3 | PAE1 | B | A | ± |
| 10-12 | melting point | (170° C.) | PAE2 | B | A | ± |
| 10-13 | of not lower | Rubber | TPU1 | B | B | ± |
| 10-14 | than 165° C. | compo- | TPU2 | B | A | ± |
| 10-15 | | sition 4 | PAE1 | B | A | ± |
| 10-16 | | (160° C.) | PAE2 | B | A | ± |
| 10-17 | | Rubber | TPU1 | A | B | + |
| 10-18 | | compo- | TPU2 | A | A | + |
| 10-19 | | sition 5 | PAE1 | A | A | + |
| 10-20 | | (150° C.) | PAE2 | A | A | + |
| 10-21 | | Rubber | TPU1 | A | B | ± |
| 10-22 | | compo- | TPU2 | A | A | ± |
| 10-23 | | sition 5 | PAE1 | A | A | ± |
| 10-24 | | (160° C.) | PAE2 | A | A | ± |
| 10-25 | | Rubber | TPU1 | A | B | ± |
| 10-26 | | compo- | TPU2 | A | A | ± |
| 10-27 | | sition 6 | PAE1 | A | A | ± |
| 10-28 | | (170° C.) | PAE2 | A | A | ± |
| 10-29 | | Rubber | TPU1 | A | B | ± |
| 10-30 | | compo- | TPU2 | A | A | ± |
| 10-31 | | sition 7 | PAE1 | A | A | ± |
| 10-32 | | (160° C.) | PAE2 | A | A | ± |
| 10-33 | | Rubber | TPU1 | A | B | ± |
| 10-34 | | compo- | TPU2 | A | A | ± |
| 10-35 | | sition 8 | PAE1 | A | A | ± |
| 10-36 | | (170° C.) | PAE2 | A | A | ± |

TABLE 11

| Examples | Sheet | Stud | Sole | Adhesion Stud/Sheet | Adhesion Sole/Sheet | Deformation |
|---|---|---|---|---|---|---|
| 11-1 | Polyamide | Rubber | TPU1 | B | B | ± |
| 11-2 | resin (11) | compo- | TPU2 | B | A | ± |
| 11-3 | amino group | sition 1 | PAE1 | B | A | ± |
| 11-4 | concentration | (160° C.) | PAE2 | B | A | ± |
| 11-5 | of 30.4 mmol/kg | Rubber | TPU1 | B | B | ± |
| 11-6 | flexural | compo- | TPU2 | B | A | ± |
| 11-7 | modulus of | sition 2 | PAE1 | B | A | ± |
| 11-8 | 730 Mpa | (160° C.) | PAE2 | B | A | ± |
| 11-9 | 50% by weight | Rubber | TPU1 | B | B | ± |
| 11-10 | of polyamide | compo- | TPU2 | B | A | ± |
| 11-11 | resin having | sition 3 | PAE1 | B | A | ± |
| 11-12 | melting point | (170° C.) | PAE2 | B | A | ± |
| 11-13 | of not lower | Rubber | TPU1 | B | B | ± |
| 11-14 | than 165° C. | compo- | TPU2 | B | A | ± |
| 11-15 | | sition 4 | PAE1 | B | A | ± |
| 11-16 | | (160° C.) | PAE2 | B | A | ± |
| 11-17 | | Rubber | TPU1 | B | B | + |
| 11-18 | | compo- | TPU2 | B | A | + |
| 11-19 | | sition 5 | PAE1 | B | A | + |
| 11-20 | | (150° C.) | PAE2 | B | A | + |
| 11-21 | | Rubber | TPU1 | A | B | ± |
| 11-22 | | compo- | TPU2 | A | A | ± |
| 11-23 | | sition 5 | PAE1 | A | A | ± |
| 11-24 | | (160° C.) | PAE2 | A | A | ± |
| 11-25 | | Rubber | TPU1 | A | B | ± |
| 11-26 | | compo- | TPU2 | A | A | ± |
| 11-27 | | sition 6 | PAE1 | A | A | ± |
| 11-28 | | (170° C.) | PAE2 | A | A | ± |
| 11-29 | | Rubber | TPU1 | A | B | ± |
| 11-30 | | compo- | TPU2 | A | A | ± |
| 11-31 | | sition 7 | PAE1 | A | A | ± |
| 11-32 | | (160° C.) | PAE2 | A | A | ± |
| 11-33 | | Rubber | TPU1 | B | B | ± |
| 11-34 | | compo- | TPU2 | B | A | ± |
| 11-35 | | sition 8 | PAE1 | B | A | ± |
| 11-36 | | (170° C.) | PAE2 | B | A | ± |

TABLE 12

| Examples | Sheet | Stud | Sole | Adhesion Stud/Sheet | Adhesion Sole/Sheet | Deformation |
|---|---|---|---|---|---|---|
| 12-1 | Polyamide | Rubber | TPU1 | B | A | + |
| 12-2 | resin (12) | compo- | TPU2 | B | B | + |
| 12-3 | amino group | sition 1 | PAE1 | B | B | + |
| 12-4 | concentration | (160° C.) | PAE2 | B | B | + |
| 12-5 | of 12 mmol/kg | Rubber | TPU1 | A | A | + |
| 12-6 | flexural | compo- | TPU2 | A | B | + |
| 12-7 | modulus of | sition 2 | PAE1 | A | B | + |
| 12-8 | 1400 MPa | (160° C.) | PAE2 | A | B | + |
| 12-9 | 100% by weight | Rubber | TPU1 | A | A | + |
| 12-10 | of polyamide | compo- | TPU2 | A | B | + |
| 12-11 | resin having | sition 3 | PAE1 | A | B | + |
| 12-12 | melting point | (170° C.) | PAE2 | A | B | + |
| 12-13 | of not lower | Rubber | TPU1 | A | A | + |
| 12-14 | than 165° C. | compo- | TPU2 | A | B | + |
| 12-15 | | sition 4 | PAE1 | A | B | + |
| 12-16 | | (160° C.) | PAE2 | A | B | + |
| 12-17 | | Rubber | TPU1 | A | A | + |
| 12-18 | | compo- | TPU2 | A | B | + |
| 12-19 | | sition 5 | PAE1 | A | B | + |
| 12-20 | | (150° C.) | PAE2 | A | B | + |
| 12-21 | | Rubber | TPU1 | A | A | + |
| 12-22 | | compo- | TPU2 | A | B | + |
| 12-23 | | sition 5 | PAE1 | A | B | + |
| 12-24 | | (160° C.) | PAE2 | A | B | + |
| 12-25 | | Rubber | TPU1 | A | A | + |
| 12-26 | | compo- | TPU2 | A | B | + |
| 12-27 | | sition 6 | PAE1 | A | B | + |
| 12-28 | | (170° C.) | PAE2 | A | B | + |
| 12-29 | | Rubber | TPU1 | A | A | + |
| 12-30 | | compo- | TPU2 | A | B | + |
| 12-31 | | sition 7 | PAE1 | A | B | + |
| 12-32 | | (160° C.) | PAE2 | A | B | + |
| 12-33 | | Rubber | TPU1 | B | A | + |
| 12-34 | | compo- | TPU2 | B | B | + |
| 12-35 | | sition 8 | PAE1 | B | B | + |
| 12-36 | | (170° C.) | PAE2 | B | B | + |

TABLE 13

| Examples | Sheet | Stud | Sole | Adhesion Stud/Sheet | Adhesion Sole/Sheet | Deformation |
|---|---|---|---|---|---|---|
| 13-1 | Polyamide | Rubber | TPU1 | B | A | + |
| 13-2 | resin (13) | compo- | TPU2 | B | A | + |
| 13-3 | amino group | sition 1 | PAE1 | B | B | + |
| 13-4 | concentration | (160° C.) | PAE2 | B | B | + |
| 13-5 | of 14 mmol/kg | Rubber | TPU1 | A | A | + |
| 13-6 | flexural | compo- | TPU2 | A | A | + |
| 13-7 | modulus of | sition 2 | PAE1 | A | B | + |
| 13-8 | 1500 Mpa | (160° C.) | PAE2 | A | B | + |
| 13-9 | 100% by weight | Rubber | TPU1 | A | A | + |
| 13-10 | of polyamide | compo- | TPU2 | A | A | + |
| 13-11 | resin having | sition 3 | PAE1 | A | B | + |
| 13-12 | melting point | (170° C.) | PAE2 | A | B | + |
| 13-13 | of not lower | Rubber | TPU1 | A | A | + |
| 13-14 | than 165° C. | compo- | TPU2 | A | A | + |
| 13-15 | | sition 4 | PAE1 | A | B | + |
| 13-16 | | (160° C.) | PAE2 | A | B | + |
| 13-17 | | Rubber | TPU1 | B | A | + |
| 13-18 | | compo- | TPU2 | B | A | + |
| 13-19 | | sition 5 | PAE1 | B | B | + |
| 13-20 | | (150° C.) | PAE2 | B | B | + |
| 13-21 | | Rubber | TPU1 | A | A | + |
| 13-22 | | compo- | TPU2 | A | A | + |
| 13-23 | | sition 5 | PAE1 | A | B | + |
| 13-24 | | (160° C.) | PAE2 | A | B | + |
| 13-25 | | Rubber | TPU1 | A | A | + |
| 13-26 | | compo- | TPU2 | A | A | + |
| 13-27 | | sition 6 | PAE1 | A | B | + |
| 13-28 | | (170° C.) | PAE2 | A | B | + |

TABLE 13-continued

| Examples | Sheet | Stud | Sole | Adhesion Stud/Sheet | Adhesion Sole/Sheet | Deformation |
|---|---|---|---|---|---|---|
| 13-29 | | Rubber | TPU1 | A | A | + |
| 13-30 | | compo- | TPU2 | A | A | + |
| 13-31 | | sition 7 | PAE1 | A | B | + |
| 13-32 | | (160° C.) | PAE2 | A | B | + |
| 13-33 | | Rubber | TPU1 | A | A | + |
| 13-34 | | compo- | TPU2 | A | A | + |
| 13-35 | | sition 8 | PAE1 | A | B | + |
| 13-36 | | (170° C.) | PAE2 | A | B | + |

TABLE 14

| Examples | Sheet | Stud | Sole | Adhesion Stud/Sheet | Adhesion Sole/Sheet | Deformation |
|---|---|---|---|---|---|---|
| 14-1 | Polyamide | Rubber | TPU1 | B | A | + |
| 14-2 | resin (14) | compo- | TPU2 | B | A | + |
| 14-3 | amino group | sition 1 | PAE1 | B | B | + |
| 14-4 | concentration | (160° C.) | PAE2 | B | B | + |
| 14-5 | of 42 mmol/kg | Rubber | TPU1 | A | A | + |
| 14-6 | flexural | compo- | TPU2 | A | A | + |
| 14-7 | modulus of | sition 2 | PAE1 | A | B | + |
| 14-8 | 800 Mpa | (160° C.) | PAE2 | A | B | + |
| 14-9 | 100% by weight | Rubber | TPU1 | B | A | + |
| 14-10 | of polyamide | compo- | TPU2 | B | A | + |
| 14-11 | resin having | sition 3 | PAE1 | B | B | + |
| 14-12 | melting point | (170° C.) | PAE2 | B | B | + |
| 14-13 | of not lower | Rubber | TPU1 | B | A | + |
| 14-14 | than 165° C. | compo- | TPU2 | B | A | + |
| 14-15 | | sition 4 | PAE1 | B | B | + |
| 14-16 | | (160° C.) | PAE2 | B | B | + |
| 14-17 | | Rubber | TPU1 | B | A | + |
| 14-18 | | compo- | TPU2 | B | A | + |
| 14-19 | | sition 5 | PAE1 | B | B | + |
| 14-20 | | (150° C.) | PAE2 | B | B | + |
| 14-21 | | Rubber | TPU1 | A | A | + |
| 14-22 | | compo- | TPU2 | A | A | + |
| 14-23 | | sition 5 | PAE1 | A | B | + |
| 14-24 | | (160° C.) | PAE2 | A | B | + |
| 14-25 | | Rubber | TPU1 | A | A | + |
| 14-26 | | compo- | TPU2 | A | A | + |
| 14-27 | | sition 6 | PAE1 | A | B | + |
| 14-28 | | (170° C.) | PAE2 | A | B | + |
| 14-29 | | Rubber | TPU1 | A | A | + |
| 14-30 | | compo- | TPU2 | A | A | + |
| 14-31 | | sition 7 | PAE1 | A | B | + |
| 14-32 | | (160° C.) | PAE2 | A | B | + |
| 14-33 | | Rubber | TPU1 | A | A | + |
| 14-34 | | compo- | TPU2 | A | A | + |
| 14-35 | | sition 8 | PAE1 | A | B | + |
| 14-36 | | (170° C.) | PAE2 | A | B | + |

TABLE 15

| Comparative Examples | Sheet | Stud | Sole | Adhesion Stud/Sheet | Adhesion Sole/Sheet | Deformation |
|---|---|---|---|---|---|---|
| 1-1 | Polyamide | Rubber | TPU1 | C | C | + |
| 1-2 | resin (15) | compo- | TPU2 | C | C | + |
| 1-3 | amino group | sition 1 | PAE1 | C | B | + |
| 1-4 | concentration | (160° C.) | PAE2 | C | B | + |
| 1-5 | of 5 mmol/kg | Rubber | TPU1 | C | C | + |
| 1-6 | flexural | compo- | TPU2 | C | C | + |
| 1-7 | modulus of | sition 2 | PAE1 | C | B | + |
| 1-8 | 1200 Mpa | (160° C.) | PAE2 | C | B | + |
| 1-9 | 100% by weight | Rubber | TPU1 | C | C | − |
| 1-10 | of polyamide | compo- | TPU2 | C | C | − |
| 1-11 | resin having | sition 3 | PAE1 | C | B | − |
| 1-12 | melting point | (170° C.) | PAE2 | C | B | − |
| 1-13 | of not lower | Rubber | TPU1 | C | C | + |
| 1-14 | than 165° C. | compo- | TPU2 | C | C | + |
| 1-15 | | sition 4 | PAE1 | C | B | + |
| 1-16 | | (160° C.) | PAE2 | C | B | + |
| 1-17 | | Rubber | TPU1 | C | C | + |
| 1-18 | | compo- | TPU2 | C | C | + |
| 1-19 | | sition 5 | PAE1 | C | B | + |
| 1-20 | | (150° C.) | PAE2 | C | B | + |
| 1-21 | | Rubber | TPU1 | C | C | + |
| 1-22 | | compo- | TPU2 | C | C | + |
| 1-23 | | sition 5 | PAE1 | C | B | + |
| 1-24 | | (160° C.) | PAE2 | C | B | + |
| 1-25 | | Rubber | TPU1 | C | C | − |
| 1-26 | | compo- | TPU2 | C | C | − |
| 1-27 | | sition 6 | PAE1 | C | B | − |
| 1-28 | | (170° C.) | PAE2 | C | B | − |
| 1-29 | | Rubber | TPU1 | C | C | + |
| 1-30 | | compo- | TPU2 | C | C | + |
| 1-31 | | sition 7 | PAE1 | C | B | + |
| 1-32 | | (160° C.) | PAE2 | C | B | + |
| 1-33 | | Rubber | TPU1 | C | C | − |
| 1-34 | | compo- | TPU2 | C | C | − |
| 1-35 | | sition 8 | PAE1 | C | B | − |
| 1-36 | | (170° C.) | PAE2 | C | B | − |

TABLE 16

| Comparative Examples | Sheet | Stud | Sole | Adhesion Stud/Sheet | Adhesion Sole/Sheet | Deformation |
|---|---|---|---|---|---|---|
| 2-1 | Polyamide | Rubber | TPU1 | C | C | + |
| 2-2 | resin (16) | compo- | TPU2 | C | C | + |
| 2-3 | amino group | sition 1 | PAE1 | C | B | + |
| 2-4 | concentration | (160° C.) | PAE2 | C | B | + |
| 2-5 | of 5 mmol/kg | Rubber | TPU1 | C | C | + |
| 2-6 | flexural | compo- | TPU2 | C | C | + |
| 2-7 | modulus of | sition 2 | PAE1 | C | B | + |
| 2-8 | 490 Mpa | (160° C.) | PAE2 | C | B | + |
| 2-9 | 100% by weight | Rubber | TPU1 | C | C | − |
| 2-10 | of polyamide | compo- | TPU2 | C | C | − |
| 2-11 | resin having | sition 3 | PAE1 | C | B | − |
| 2-12 | melting point | (170° C.) | PAE2 | C | B | − |
| 2-13 | of not lower | Rubber | TPU1 | C | C | + |
| 2-14 | than 165° C. | compo- | TPU2 | C | C | + |
| 2-15 | | sition 4 | PAE1 | C | B | + |
| 2-16 | | (160° C.) | PAE2 | C | B | + |
| 2-17 | | Rubber | TPU1 | C | C | + |
| 2-18 | | compo- | TPU2 | C | C | + |
| 2-19 | | sition 5 | PAE1 | C | B | + |
| 2-20 | | (150° C.) | PAE2 | C | B | + |
| 2-21 | | Rubber | TPU1 | C | C | + |
| 2-22 | | compo- | TPU2 | C | C | + |
| 2-23 | | sition 5 | PAE1 | C | B | + |
| 2-24 | | (160° C.) | PAE2 | C | B | + |
| 2-25 | | Rubber | TPU1 | C | C | − |
| 2-26 | | compo- | TPU2 | C | C | − |
| 2-27 | | sition 6 | PAE1 | C | B | − |
| 2-28 | | (170° C.) | PAE2 | C | B | − |
| 2-29 | | Rubber | TPU1 | C | C | + |
| 2-30 | | compo- | TPU2 | C | C | + |
| 2-31 | | sition 7 | PAE1 | C | B | + |
| 2-32 | | (160° C.) | PAE2 | C | B | + |
| 2-33 | | Rubber | TPU1 | C | C | − |
| 2-34 | | compo- | TPU2 | C | C | − |
| 2-35 | | sition 8 | PAE1 | C | B | − |
| 2-36 | | (170° C.) | PAE2 | C | B | − |

TABLE 17

| Comparative Examples | Sheet | Stud | Sole | Adhesion Stud/Sheet | Adhesion Sole/Sheet | Deformation |
|---|---|---|---|---|---|---|
| 3-1 | Polyamide | Rubber | TPU1 | C | C | − |
| 3-2 | resin (17) | compo- | TPU2 | C | C | − |
| 3-3 | amino group | sition 1 | PAE1 | C | B | − |
| 3-4 | concentration | (160° C.) | PAE2 | C | B | − |
| 3-5 | of 5 mmol/kg | Rubber | TPU1 | C | C | − |
| 3-6 | flexural | compo- | TPU2 | C | C | − |
| 3-7 | modulus of | sition 2 | PAE1 | C | B | − |
| 3-8 | 340 Mpa | (160° C.) | PAE2 | C | B | − |
| 3-9 | 100% by weight | Rubber | TPU1 | C | C | − |
| 3-10 | of polyamide | compo- | TPU2 | C | C | − |
| 3-11 | resin having | sition 3 | PAE1 | C | B | − |
| 3-12 | melting point | (170° C.) | PAE2 | C | B | − |
| 3-13 | of not lower | Rubber | TPU1 | C | C | − |
| 3-14 | than 165° C. | compo- | TPU2 | C | C | − |
| 3-15 | | sition 4 | PAE1 | C | B | − |
| 3-16 | | (160° C.) | PAE2 | C | B | − |
| 3-17 | | Rubber | TPU1 | C | C | + |
| 3-18 | | compo- | TPU2 | C | C | + |
| 3-19 | | sition 5 | PAE1 | C | B | + |
| 3-20 | | (150° C.) | PAE2 | C | B | + |
| 3-21 | | Rubber | TPU1 | C | C | − |
| 3-22 | | compo- | TPU2 | C | C | − |
| 3-23 | | sition 5 | PAE1 | C | B | − |
| 3-24 | | (160° C.) | PAE2 | C | B | − |
| 3-25 | | Rubber | TPU1 | C | C | − |
| 3-26 | | compo- | TPU2 | C | C | − |
| 3-27 | | sition 6 | PAE1 | C | B | − |
| 3-28 | | (170° C.) | PAE2 | C | B | − |
| 3-29 | | Rubber | TPU1 | C | C | − |
| 3-30 | | compo- | TPU2 | C | C | − |
| 3-31 | | sition 7 | PAE1 | C | B | − |
| 3-32 | | (160° C.) | PAE2 | C | B | − |
| 3-33 | | Rubber | TPU1 | C | C | − |
| 3-34 | | compo- | TPU2 | C | C | − |
| 3-35 | | sition 8 | PAE1 | C | B | − |
| 3-36 | | (170° C.) | PAE2 | C | B | − |

TABLE 18

| Comparative Examples | Sheet | Stud | Sole | Adhesion Stud/Sheet | Adhesion Sole/Sheet | Deformation |
|---|---|---|---|---|---|---|
| 4-1 | Polyamide | Rubber | TPU1 | B | B | − |
| 4-2 | resin (18) | compo- | TPU2 | B | B | − |
| 4-3 | amino group | sition 1 | PAE1 | B | B | − |
| 4-4 | concentration | (160° C.) | PAE2 | B | B | − |
| 4-5 | of 17 mmol/kg | Rubber | TPU1 | A | B | − |
| 4-6 | flexural | compo- | TPU2 | A | B | − |
| 4-7 | modulus of | sition 2 | PAE1 | A | B | − |
| 4-8 | 240 Mpa | (160° C.) | PAE2 | A | B | − |
| 4-9 | 0% by weight | Rubber | TPU1 | A | B | − |
| 4-10 | of polyamide | compo- | TPU2 | A | B | − |
| 4-11 | resin having | sition 3 | PAE1 | A | B | − |
| 4-12 | melting point | (170° C.) | PAE2 | A | B | − |
| 4-13 | of not lower | Rubber | TPU1 | A | B | − |
| 4-14 | than 165° C. | compo- | TPU2 | A | B | − |
| 4-15 | | sition 4 | PAE1 | A | B | − |
| 4-16 | | (160° C.) | PAE2 | A | B | − |
| 4-17 | | Rubber | TPU1 | A | B | − |
| 4-18 | | compo- | TPU2 | A | B | − |
| 4-19 | | sition 5 | PAE1 | A | B | − |
| 4-20 | | (160° C.) | PAE2 | A | B | − |
| 4-21 | | Rubber | TPU1 | A | B | − |
| 4-22 | | compo- | TPU2 | A | B | − |
| 4-23 | | sition 6 | PAE1 | A | B | − |
| 4-24 | | (170° C.) | PAE2 | A | B | − |
| 4-25 | | Rubber | TPU1 | A | B | − |
| 4-26 | | compo- | TPU2 | A | B | − |
| 4-27 | | sition 7 | PAE1 | A | B | − |
| 4-28 | | (160° C.) | PAE2 | A | B | − |
| 4-29 | | Rubber | TPU1 | A | B | − |
| 4-30 | | compo- | TPU2 | A | B | − |
| 4-31 | | sition 8 | PAE1 | A | B | − |
| 4-32 | | (170° C.) | PAE2 | A | B | − |

TABLE 19

| Comparative Examples | Sheet | Stud | Sole | Adhesion Stud/Sheet | Adhesion Sole/Sheet | Deformation |
|---|---|---|---|---|---|---|
| 5-1 | Polyamide | Rubber | TPU1 | C | C | − |
| 5-2 | resin (19) | compo- | TPU2 | C | C | − |
| 5-3 | amino group | sition 1 | PAE1 | C | B | − |
| 5-4 | concentration | (160° C.) | PAE2 | C | B | − |
| 5-5 | of 5 mmol/kg | Rubber | TPU1 | C | C | − |
| 5-6 | flexural | compo- | TPU2 | C | C | − |
| 5-7 | modulus of | sition 2 | PAE1 | C | B | − |
| 5-8 | 210 Mpa | (160° C.) | PAE2 | C | B | − |
| 5-9 | 0% by weight | Rubber | TPU1 | C | C | − |
| 5-10 | of polyamide | compo- | TPU2 | C | C | − |
| 5-11 | resin having | sition 3 | PAE1 | C | B | − |
| 5-12 | melting point | (170° C.) | PAE2 | C | B | − |
| 5-13 | of not lower | Rubber | TPU1 | C | C | − |
| 5-14 | than 165° C. | compo- | TPU2 | C | C | − |
| 5-15 | | sition 4 | PAE1 | C | B | − |
| 5-16 | | (160° C.) | PAE2 | C | B | − |
| 5-17 | | Rubber | TPU1 | C | C | ± |
| 5-18 | | compo- | TPU2 | C | C | ± |
| 5-19 | | sition 5 | PAE1 | C | B | ± |
| 5-20 | | (150° C.) | PAE2 | C | B | ± |
| 5-21 | | Rubber | TPU1 | C | C | − |
| 5-22 | | compo- | TPU2 | C | C | − |
| 5-23 | | sition 5 | PAE1 | C | B | − |
| 5-24 | | (160° C.) | PAE2 | C | B | − |
| 5-25 | | Rubber | TPU1 | C | C | − |
| 5-26 | | compo- | TPU2 | C | C | − |
| 5-27 | | sition 6 | PAE1 | C | B | − |
| 5-28 | | (170° C.) | PAE2 | C | B | − |
| 5-29 | | Rubber | TPU1 | C | C | − |
| 5-30 | | compo- | TPU2 | C | C | − |
| 5-31 | | sition 7 | PAE1 | C | B | − |
| 5-32 | | (160° C.) | PAE2 | C | B | − |
| 5-33 | | Rubber | TPU1 | C | C | − |
| 5-34 | | compo- | TPU2 | C | C | − |
| 5-35 | | sition 8 | PAE1 | C | B | − |
| 5-36 | | (170° C.) | PAE2 | C | B | − |

TABLE 20

| Comparative Examples | Sheet | Stud | Sole | Adhesion Stud/Sheet | Adhesion Sole/Sheet | Deformation |
|---|---|---|---|---|---|---|
| 6-1 | Polyamide | Rubber | TPU1 | B | A | − |
| 6-2 | resin (20) | compo- | TPU2 | B | A | − |
| 6-3 | amino group | sition 1 | PAE1 | B | B | − |
| 6-4 | concentration | (160° C.) | PAE2 | B | B | − |
| 6-5 | of 42 mmol/kg | Rubber | TPU1 | A | A | − |
| 6-6 | flexural | compo- | TPU2 | A | A | − |
| 6-7 | modulus of | sition 2 | PAE1 | A | B | − |
| 6-8 | 230 Mpa | (160° C.) | PAE2 | A | B | − |
| 6-9 | 0% by weight | Rubber | TPU1 | A | A | − |
| 6-10 | of polyamide | compo- | TPU2 | A | A | − |
| 6-11 | resin having | sition 3 | PAE1 | A | B | − |
| 6-12 | melting point | (170° C.) | PAE2 | A | B | − |
| 6-13 | of not lower | Rubber | TPU1 | A | A | − |
| 6-14 | than 165° C. | compo- | TPU2 | A | A | − |

TABLE 20-continued

| Comparative Examples | Sheet | Stud | Sole | Adhesion Stud/Sheet | Adhesion Sole/Sheet | Deformation |
|---|---|---|---|---|---|---|
| 6-15 | sition 4 | | PAE1 | A | B | — |
| 6-16 | (160° C.) | | PAE2 | A | B | — |
| 6-17 | | Rubber | TPU1 | A | A | — |
| 6-18 | | compo- | TPU2 | A | A | — |
| 6-19 | sition 5 | | PAE1 | A | B | — |
| 6-20 | (160° C.) | | PAE2 | A | B | — |
| 6-21 | | Rubber | TPU1 | A | A | — |
| 6-22 | | compo- | TPU2 | A | A | — |
| 6-23 | sition 6 | | PAE1 | A | B | — |
| 6-24 | (170° C.) | | PAE2 | A | B | — |
| 6-25 | | Rubber | TPU1 | A | A | — |
| 6-26 | | compo- | TPU2 | A | A | — |
| 6-27 | sition 7 | | PAE1 | A | B | — |
| 6-28 | (160° C.) | | PAE2 | A | B | — |
| 6-29 | | Rubber | TPU1 | A | A | — |
| 6-30 | | compo- | TPU2 | A | A | — |
| 6-31 | sition 8 | | PAE1 | A | B | — |
| 6-32 | (170° C.) | | PAE2 | A | B | — |

TABLE 21

| Comparative Examples | Sheet | Stud | Sole | Adhesion Stud/Sheet | Adhesion Sole/Sheet | Deformation |
|---|---|---|---|---|---|---|
| 7-1 | Polyamide | Rubber | TPU1 | B | B | — |
| 7-2 | resin (21) | compo- | TPU2 | B | B | — |
| 7-3 | amino group | sition 1 | PAE1 | B | B | — |
| 7-4 | concentration | (160° C.) | PAE2 | B | B | — |
| 7-5 | of 17 mmol/kg | Rubber | TPU1 | A | B | — |
| 7-6 | flexural | compo- | TPU2 | A | B | — |
| 7-7 | modulus of | sition 2 | PAE1 | A | B | — |
| 7-8 | 170 Mpa | (160° C.) | PAE2 | A | B | — |
| 7-9 | 0% by weight | Rubber | TPU1 | A | B | — |
| 7-10 | of polyamide | compo- | TPU2 | A | B | — |
| 7-11 | resin having | sition 3 | PAE1 | A | B | — |
| 7-12 | melting point | (170° C.) | PAE2 | A | B | — |
| 7-13 | of not lower | Rubber | TPU1 | A | B | — |
| 7-14 | than 165° C. | compo- | TPU2 | A | B | — |
| 7-15 | | sition 4 | PAE1 | A | B | — |
| 7-16 | | (160° C.) | PAE2 | A | B | — |
| 7-17 | | Rubber | TPU1 | A | B | — |
| 7-18 | | compo- | TPU2 | A | B | — |
| 7-19 | | sition 5 | PAE1 | A | B | — |
| 7-20 | | (150° C.) | PAE2 | A | B | — |
| 7-21 | | Rubber | TPU1 | A | B | — |
| 7-22 | | compo- | TPU2 | A | B | — |
| 7-23 | | sition 5 | PAE1 | A | B | — |
| 7-24 | | (160° C.) | PAE2 | A | B | — |
| 7-25 | | Rubber | TPU1 | A | B | — |
| 7-26 | | compo- | TPU2 | A | B | — |
| 7-27 | | sition 6 | PAE1 | A | B | — |
| 7-28 | | (170° C.) | PAE2 | A | B | — |
| 7-29 | | Rubber | TPU1 | A | B | — |
| 7-30 | | compo- | TPU2 | A | B | — |
| 7-31 | | sition 7 | PAE1 | A | B | — |
| 7-32 | | (160° C.) | PAE2 | A | B | — |
| 7-33 | | Rubber | TPU1 | A | B | — |
| 7-34 | | compo- | TPU2 | A | B | — |
| 7-35 | | sition 8 | PAE1 | A | B | — |
| 7-36 | | (170° C.) | PAE2 | A | B | — |

TABLE 22

| Comparative Examples | Sheet | Stud | Sole | Adhesion Stud/Sheet | Adhesion Sole/Sheet | Deformation |
|---|---|---|---|---|---|---|
| 8-1 | Polyamide | Rubber | TPU1 | B | B | — |
| 8-2 | resin (22) | compo- | TPU2 | B | B | — |
| 8-3 | amino group | sition 1 | PAE1 | B | B | — |
| 8-4 | concentration | (160° C.) | PAE2 | B | B | — |
| 8-5 | of 30 mmol/kg | Rubber | TPU1 | B | B | — |
| 8-6 | flexural | compo- | TPU2 | B | B | — |
| 8-7 | modulus of | sition 2 | PAE1 | B | B | — |
| 8-8 | 45 Mpa | (160° C.) | PAE2 | B | B | — |
| 8-9 | 0% by weight | Rubber | TPU1 | B | B | — |
| 8-10 | of polyamide | compo- | TPU2 | B | B | — |
| 8-11 | resin having | sition 3 | PAE1 | B | B | — |
| 8-12 | melting point | (170° C.) | PAE2 | B | B | — |
| 8-13 | of not lower | Rubber | TPU1 | B | B | — |
| 8-14 | than 165° C. | compo- | TPU2 | B | B | — |
| 8-15 | | sition 4 | PAE1 | B | B | — |
| 8-16 | | (160° C.) | PAE2 | B | B | — |
| 8-17 | | Rubber | TPU1 | B | B | — |
| 8-18 | | compo- | TPU2 | B | B | — |
| 8-19 | | sition 5 | PAE1 | B | B | — |
| 8-20 | | (150° C.) | PAE2 | B | B | — |
| 8-21 | | Rubber | TPU1 | A | B | — |
| 8-22 | | compo- | TPU2 | A | B | — |
| 8-23 | | sition 5 | PAE1 | A | B | — |
| 8-24 | | (160° C.) | PAE2 | A | B | — |
| 8-25 | | Rubber | TPU1 | A | B | — |
| 8-26 | | compo- | TPU2 | A | B | — |
| 8-27 | | sition 6 | PAE1 | A | B | — |
| 8-28 | | (170° C.) | PAE2 | A | B | — |
| 8-29 | | Rubber | TPU1 | A | B | — |
| 8-30 | | compo- | TPU2 | A | B | — |
| 8-31 | | sition 7 | PAE1 | A | B | — |
| 8-32 | | (160° C.) | PAE2 | A | B | — |
| 8-33 | | Rubber | TPU1 | A | B | — |
| 8-34 | | compo- | TPU2 | A | B | — |
| 8-35 | | sition 8 | PAE1 | A | B | — |
| 8-36 | | (170° C.) | PAE2 | A | B | — |

TABLE 23

| Comparative Examples | Sheet | Stud | Sole | Adhesion Stud/Sheet | Adhesion Sole/Sheet | Deformation |
|---|---|---|---|---|---|---|
| 9-1 | Polyamide | Rubber | TPU1 | A | A | — |
| 9-2 | resin (23) | compo- | TPU2 | A | A | — |
| 9-3 | amino group | sition 1 | PAE1 | A | B | — |
| 9-4 | concentration | (160° C.) | PAE2 | A | B | — |
| 9-5 | of 38 mmol/kg | Rubber | TPU1 | A | A | — |
| 9-6 | flexural | compo- | TPU2 | A | A | — |
| 9-7 | modulus of | sition 2 | PAE1 | A | B | — |
| 9-8 | 190 Mpa | (160° C.) | PAE2 | A | B | — |
| 9-9 | 0% by weight | Rubber | TPU1 | B | A | — |
| 9-10 | of polyamide | compo- | TPU2 | B | A | — |
| 9-11 | resin having | sition 3 | PAE1 | B | B | — |
| 9-12 | melting point | (170° C.) | PAE2 | B | B | — |
| 9-13 | of not lower | Rubber | TPU1 | A | A | — |
| 9-14 | than 165° C. | compo- | TPU2 | A | A | — |
| 9-15 | | sition 4 | PAE1 | A | B | — |
| 9-16 | | (160° C.) | PAE2 | A | B | — |
| 9-17 | | Rubber | TPU1 | A | A | — |
| 9-18 | | compo- | TPU2 | A | A | — |
| 9-19 | | sition 5 | PAE1 | A | B | — |
| 9-20 | | (150° C.) | PAE2 | A | B | — |
| 9-21 | | Rubber | TPU1 | A | A | — |
| 9-22 | | compo- | TPU2 | A | A | — |
| 9-23 | | sition 5 | PAE1 | A | B | — |
| 9-24 | | (160° C.) | PAE2 | A | B | — |
| 9-25 | | Rubber | TPU1 | A | A | — |
| 9-26 | | compo- | TPU2 | A | A | — |
| 9-27 | | sition 6 | PAE1 | A | B | — |
| 9-28 | | (170° C.) | PAE2 | A | B | — |

TABLE 23-continued

| Comparative Examples | Sheet | Stud | Sole | Adhesion Stud/Sheet | Adhesion Sole/Sheet | Deformation |
|---|---|---|---|---|---|---|
| 9-29 | | Rubber | TPU1 | A | A | − |
| 9-30 | | compo- | TPU2 | A | A | − |
| 9-31 | | sition 7 | PAE1 | A | B | − |
| 9-32 | | (160° C.) | PAE2 | A | B | − |
| 9-33 | | Rubber | TPU1 | A | A | − |
| 9-34 | | compo- | TPU2 | A | A | − |
| 9-35 | | sition 8 | PAE1 | A | B | − |
| 9-36 | | (170° C.) | PAE2 | A | B | − |

TABLE 24

| Comparative Examples | Sheet | Stud | Sole | Adhesion Stud/Sheet | Adhesion Sole/Sheet | Deformation |
|---|---|---|---|---|---|---|
| 10-1 | Polyamide | Rubber | TPU1 | C | C | − |
| 10-2 | resin (24) | compo- | TPU2 | C | C | − |
| 10-3 | amino group | sition 1 | PAE1 | C | B | − |
| 10-4 | concentration | (160° C.) | PAE2 | C | B | − |
| 10-5 | of 9 mmol/kg | Rubber | TPU1 | C | C | − |
| 10-6 | flexural | compo- | TPU2 | C | C | − |
| 10-7 | modulus of | sition 2 | PAE1 | C | B | − |
| 10-8 | 290 Mpa | (160° C.) | PAE2 | C | B | − |
| 10-9 | 100% by weight | Rubber | TPU1 | C | C | − |
| 10-10 | of polyamide | compo- | TPU2 | C | C | − |
| 10-11 | resin having | sition 3 | PAE1 | C | B | − |
| 10-12 | melting point | (170° C.) | PAE2 | C | B | − |
| 10-13 | of not lower | Rubber | TPU1 | C | C | − |
| 10-14 | than 165° C. | compo- | TPU2 | C | C | − |
| 10-15 | | sition 4 | PAE1 | C | B | − |
| 10-16 | | (160° C.) | PAE2 | C | B | − |
| 10-17 | | Rubber | TPU1 | C | C | ± |
| 10-18 | | compo- | TPU2 | C | C | ± |
| 10-19 | | sition 5 | PAE1 | C | B | ± |
| 10-20 | | (150° C.) | PAE2 | C | B | ± |
| 10-21 | | Rubber | TPU1 | C | C | − |
| 10-22 | | compo- | TPU2 | C | C | − |
| 10-23 | | sition 5 | PAE1 | C | B | − |
| 10-24 | | (160° C.) | PAE2 | C | B | − |
| 10-25 | | Rubber | TPU1 | B | C | − |
| 10-26 | | compo- | TPU2 | B | C | − |
| 10-27 | | sition 6 | PAE1 | B | B | − |
| 10-28 | | (170° C.) | PAE2 | B | B | − |
| 10-29 | | Rubber | TPU1 | B | C | − |
| 10-30 | | compo- | TPU2 | B | C | − |
| 10-31 | | sition 7 | PAE1 | B | B | − |
| 10-32 | | (160° C.) | PAE2 | B | B | − |
| 10-33 | | Rubber | TPU1 | C | C | − |
| 10-34 | | compo- | TPU2 | C | C | − |
| 10-35 | | sition 8 | PAE1 | C | B | − |
| 10-36 | | (170° C.) | PAE2 | C | B | − |

TABLE 25

| Comparative Examples | Sheet | Stud | Sole | Adhesion Stud/Sheet | Adhesion Sole/Sheet | Deformation |
|---|---|---|---|---|---|---|
| 11-1 | Polyamide | Rubber | TPU1 | C | C | − |
| 11-2 | resin (25) | compo- | TPU2 | C | B | − |
| 11-3 | amino group | sition 1 | PAE1 | C | B | − |
| 11-4 | concentration | (160° C.) | PAE2 | C | B | − |
| 11-5 | of 9 mmol/kg | Rubber | TPU1 | C | C | − |
| 11-6 | flexural | compo- | TPU2 | C | B | − |
| 11-7 | modulus of | sition 2 | PAE1 | C | B | − |
| 11-8 | 160 Mpa | (160° C.) | PAE2 | C | B | − |
| 11-9 | 0% by weight | Rubber | TPU1 | C | C | − |
| 11-10 | of polyamide | compo- | TPU2 | C | B | − |
| 11-11 | resin having | sition 3 | PAE1 | C | B | − |
| 11-12 | melting point | (170° C.) | PAE2 | C | B | − |
| 11-13 | of not lower | Rubber | TPU1 | C | C | − |
| 11-14 | than 165° C. | compo- | TPU2 | C | B | − |
| 11-15 | | sition 4 | PAE1 | C | B | − |
| 11-16 | | (160° C.) | PAE2 | C | B | − |
| 11-17 | | Rubber | TPU1 | C | C | − |
| 11-18 | | compo- | TPU2 | C | B | − |
| 11-19 | | sition 5 | PAE1 | C | B | − |
| 11-20 | | (150° C.) | PAE2 | C | B | − |
| 11-21 | | Rubber | TPU1 | C | C | − |
| 11-22 | | compo- | TPU2 | C | B | − |
| 11-23 | | sition 5 | PAE1 | C | B | − |
| 11-24 | | (160° C.) | PAE2 | C | B | − |
| 11-25 | | Rubber | TPU1 | B | C | − |
| 11-26 | | compo- | TPU2 | B | B | − |
| 11-27 | | sition 6 | PAE1 | B | B | − |
| 11-28 | | (170° C.) | PAE2 | B | B | − |
| 11-29 | | Rubber | TPU1 | B | C | − |
| 11-30 | | compo- | TPU2 | B | B | − |
| 11-31 | | sition 7 | PAE1 | B | B | − |
| 11-32 | | (160° C.) | PAE2 | B | B | − |
| 11-33 | | Rubber | TPU1 | C | C | − |
| 11-34 | | compo- | TPU2 | C | B | − |
| 11-35 | | sition 8 | PAE1 | C | B | − |
| 11-36 | | (170° C.) | PAE2 | C | B | − |

TABLE 26

| Comparative Examples | Sheet | Stud | Sole | Adhesion Stud/Sheet | Adhesion Sole/Sheet | Deformation |
|---|---|---|---|---|---|---|
| 12-1 | Polyamide | Rubber | TPU1 | A | A | − |
| 12-2 | resin (26) | compo- | TPU2 | A | A | − |
| 12-3 | amino group | sition 1 | PAE1 | A | B | − |
| 12-4 | concentration | (160° C.) | PAE2 | A | B | − |
| 12-5 | of 7.4 mmol/kg | Rubber | TPU1 | A | A | − |
| 12-6 | flexural | compo- | TPU2 | A | A | − |
| 12-7 | modulus of | sition 2 | PAE1 | A | B | − |
| 12-8 | 550 Mpa | (160° C.) | PAE2 | A | B | − |
| 12-9 | 40% by weight | Rubber | TPU1 | B | A | − |
| 12-10 | of polyamide | compo- | TPU2 | B | A | − |
| 12-11 | resin having | sition 3 | PAE1 | B | B | − |
| 12-12 | melting point | (170° C.) | PAE2 | B | B | − |
| 12-13 | of not lower | Rubber | TPU1 | A | A | − |
| 12-14 | than 165° C. | compo- | TPU2 | A | A | − |
| 12-15 | | sition 4 | PAE1 | A | B | − |
| 12-16 | | (160° C.) | PAE2 | A | B | − |
| 12-17 | | Rubber | TPU1 | A | A | − |
| 12-18 | | compo- | TPU2 | A | A | − |
| 12-19 | | sition 5 | PAE1 | A | B | − |
| 12-20 | | (150° C.) | PAE2 | A | B | − |
| 12-21 | | Rubber | TPU1 | A | A | − |
| 12-22 | | compo- | TPU2 | A | A | − |
| 12-23 | | sition 5 | PAE1 | A | B | − |
| 12-24 | | (160° C.) | PAE2 | A | B | − |
| 12-25 | | Rubber | TPU1 | A | A | − |
| 12-26 | | compo- | TPU2 | A | A | − |
| 12-27 | | sition 6 | PAE1 | A | B | − |
| 12-28 | | (170° C.) | PAE2 | A | B | − |
| 12-29 | | Rubber | TPU1 | A | A | − |
| 12-30 | | compo- | TPU2 | A | A | − |
| 12-31 | | sition 7 | PAE1 | A | B | − |
| 12-32 | | (160° C.) | PAE2 | A | B | − |
| 12-33 | | Rubber | TPU1 | A | A | − |
| 12-34 | | compo- | TPU2 | A | A | − |
| 12-35 | | sition 8 | PAE1 | A | B | − |
| 12-36 | | (170° C.) | PAE2 | A | B | − |

As apparent from the results shown in the tables, it was found that, in terms of the amino group content of the polyamide resin, a large difference in adhesion appeared about 10 mmol/kg, and that the deformation could be prevented or inhibited at a flexural modulus of the polyamide resin of not less than 300 MPa. Moreover, it was found that the prevention of such adhesion or deformation advantageously achieved in the polyamide resin containing a resin having a melting point of not lower than 165° C.

INDUSTRIAL APPLICABILITY

The molded composite article as a shoe sole according to the present invention is usable for various shoe soles. In particular, the molded composite article is useful as a shoe sole for shoes that requires a function such as a friction resistance or a cushion property [for example, shoes to be used in the sports field (e.g., shoes for gymnasium and shoes for artificial turf)].

The invention claimed is:

1. A molded composite article as a shoe sole, which comprises a sheet, a crosslinked rubber layer as a stud, which is directly laminated on and bonded to a first side of the sheet, and a thermoplastic elastomer layer as a sole, which is directly laminated on and bonded to a second side of the sheet,
    wherein the sheet comprises a resin component (A) containing a polyamide resin (a), the polyamide resin (a) comprising at least one member selected from the group consisting of a polyamide (a-1) and a polyamide elastomer (a-2),
    the resin component (A) is any one of the following (1) and (2):
    (1) the polyamide resin (a) consisting essentially of the polyamide elastomer (a-2) having an amino group concentration of not less than 10 mmol/kg, a melting point of not lower than 165° C., and a flexural modulus of not less than 300 MPa in accordance with ISO178,
    (2) a resin composition comprising the polyamide (a-1) and the polyamide elastomer (a-2), wherein the polyamide elastomer (a-2) has an amino group concentration of not less than 10 mmol/kg, not less than 30% by weight of the polyamide (a-1) and/or the polyamide elastomer (a-2) has a melting point of not lower than 165° C., the resin composition satisfies, as a whole, an amino group concentration of not less than 10 mmol/kg and a flexural modulus of not less than 300 MPa in accordance with ISO178,
    wherein the crosslinked rubber layer is a crosslinked layer of an uncrosslinked rubber composition comprising an uncrosslinked rubber, a crosslinking agent, and a crosslinking auxiliary, the uncrosslinked rubber comprising a non-acid-modified rubber,
    the crosslinking agent comprising a peroxide, and
    the crosslinking auxiliary comprising at least one member selected from the group consisting of a trifunctional or polyfunctional (meth)acrylate and an aromatic bismaleimide, and
    the amount of the crosslinking auxiliary is about 0.1 to 10 parts by weight relative to the 100 parts by weight of the uncrosslinked rubber,
    wherein the thermoplastic elastomer layer comprises at least one member selected from the group consisting of a polyurethane elastomer and a polyamide elastomer.

2. The molded composite article according to claim 1, wherein the non-acid-modified uncrosslinked rubber is at least one member selected from the group consisting of a diene-series rubber, an olefinic rubber, an acrylic rubber, a fluorine-containing rubber, and a silicone rubber.

3. The molded composite article according to claim 1, wherein the polyamide (a-1) is at least one member selected from the group consisting of an aliphatic polyamide (a-1a) and an alicyclic polyamide (a-1b), and the polyamide elastomer (a-2) comprises a polyamide-polyether block copolymer (a-2a).

4. The molded composite article according to claim 1, wherein the resin component (A) has an amino group concentration of 10 to 100 mmol/kg.

5. The molded composite article according to claim 1, wherein the resin component (A) is the polyamide resin composition (2), and the polyamide elastomer (a-2) has an amino group concentration of 15 to 80 mmol/kg.

6. The molded composite article according to claim 1, wherein the sheet further comprises a filler.

7. The molded composite article according to claim 1, wherein the sheet has a thickness of 0.1 to 0.7 mm.

8. The molded composite article according to claim 1, wherein the crosslinked rubber layer, the thermoplastic elastomer layer, and the sheet interposed therebetween are formed without deformation.

9. A process for producing a molded composite article as a shoe sole, which comprises
    directly forming a crosslinked rubber layer at a first side of a sheet and directly forming a thermoplastic elastomer layer at a second side of the sheet,
    wherein a molten uncrosslinked rubber composition is contacted with the first side of the sheet in a metal mold, and the uncrosslinked rubber composition is crosslinked under heating to form the crosslinked rubber layer, wherein the uncrosslinked rubber composition is crosslinked without melting the sheet and the crosslinked rubber layer is formed without opening the metal mold,
    wherein the sheet comprises a resin component (A) containing a polyamide resin (a), the polyamide resin (a) comprising at least one member selected from the group consisting of a polyamide (a-1) and a polyamide elastomer (a-2),
    the resin component (A) is any one of the following (1) and (2):
    (1) the polyamide resin (a) consisting essentially of the polyamide elastomer (a-2) having an amino group concentration of not less than 10 mmol/kg, a melting point of not lower than 165° C., and a flexural modulus of not less than 300 MPa in accordance with ISO178,
    (2) a resin composition comprising the polyamide (a-1) and the polyamide elastomer (a-2), wherein the polyamide elastomer (a-2) has an amino group concentration of not less than 10 mmol/kg, not less than 30% by weight of the polyamide (a-1) and/or the polyamide elastomer (a-1) has a melting point of not lower than 165° C., the resin composition satisfies, as a whole, an amino group concentration of not less than 10 mmol/kg and a flexural modulus of not less than 300 MPa in accordance with ISO178,
    wherein the thermoplastic elastomer layer comprises at least one member selected from the group consisting of a polyurethane elastomer and a polyamide elastomer, and
    wherein the uncrosslinked rubber composition comprises an uncrosslinked rubber, a crosslinking agent, and a crosslinking auxiliary, the uncrosslinked rubber comprising a non-acid-modified rubber,
    the crosslinking agent comprising a peroxide, and the crosslinking auxiliary comprising at least one member selected from the group consisting of a trifunctional or polyfunctional (meth)acrylate and an aromatic bismaleimide, and the amount of the crosslinking auxiliary is about 0.1 to 10 parts by weight relative to the 100 parts by weight of the uncrosslinked rubber.

10. The process according to claim 9, wherein the sheet comprises the polyamide resin (a) having a melting point of not lower than 165° C. at a proportion of not less than 50% by weight in the polyamide resin (a), and the crosslinking of the uncrosslinked rubber composition is conducted at a temperature lower than the melting point of the polyamide resin (a) having a melting point of not lower than 165° C.

11. The process according to claim 10, wherein the crosslinking temperature of the uncrosslinked rubber composition is at least 5° C. lower than the melting point of the polyamide resin (a) having a melting point of not lower than 165° C.

12. The process according to claim 9, wherein the polyamide (a-1) is at least one member selected from the group consisting of an aliphatic polyamide (a-1a) and an alicyclic polyamide (a-1b), and the polyamide elastomer (a-2) comprises a polyamide-polyether block copolymer (a-2a).

13. The process according to claim 9, wherein the resin component (A) has an amino group concentration of 10 to 100 mmol/kg.

14. The process according to claim 9, wherein the resin component (A) is the polyamide resin composition (2), and the polyamide elastomer (a-2) has an amino group concentration of 15 to 80 mmol/kg.

15. The process according to claim 9, wherein the sheet further comprises a filler.

16. The process according to claim 9, wherein the sheet has a thickness of 0.1 to 0.7 mm.

17. The process according to claim 9, wherein the crosslinked rubber layer, the thermoplastic elastomer layer, and the sheet interposed therebetween are formed without deformation.

18. A molded composite article configured as a shoe sole, said article comprising a sheet having a thickness of 0.1 to 0.7 mm, a crosslinked rubber layer as a stud directly laminated on and bonded to a first side of the sheet, and a thermoplastic elastomer layer comprising at least one member selected from the group consisting of a polyurethane elastomer and a polyamide elastomer as a sole directly laminated on and bonded to a second side of the sheet, wherein the sheet comprises a resin component (A) which is a polyamide resin consisting essentially of a polyamide elastomer having an amino group concentration of not less than 10 mmol/kg, a melting point of not lower than 165° C., and a flexural modulus of not less than 300 MPa in accordance with ISO178, wherein the resin component (A) has an amino group concentration of 10 to 100 mmol/kg, and wherein the crosslinked rubber layer is a crosslinked layer of an uncrosslinked rubber composition comprising: an uncrosslinked rubber comprising a non-acid-modified rubber; a peroxide crosslinking agent; and a crosslinking auxiliary comprising at least one member selected from the group consisting of a trifunctional or polyfunctional (meth)acrylate and an aromatic bismaleimide, with the amount of the crosslinking auxiliary being about 0.1 to 10 parts by weight relative to the 100 parts by weight of the uncrosslinked rubber.

* * * * *